(12) United States Patent
Curran

(10) Patent No.: US 12,379,465 B1
(45) Date of Patent: Aug. 5, 2025

(54) IDENTIFICATION OF ROOM PERIMETER USING RADAR

(71) Applicant: Apple Inc., Cupertino, CA (US)

(72) Inventor: James T. Curran, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 171 days.

(21) Appl. No.: 17/933,383

(22) Filed: Sep. 19, 2022

Related U.S. Application Data

(60) Provisional application No. 63/248,227, filed on Sep. 24, 2021.

(51) Int. Cl.
*G01S 7/41* (2006.01)
*G01S 13/58* (2006.01)
*G01S 13/89* (2006.01)

(52) U.S. Cl.
CPC ............ *G01S 7/412* (2013.01); *G01S 13/589* (2013.01); *G01S 13/89* (2013.01)

(58) Field of Classification Search
None
See application file for complete search history.

(56) References Cited

U.S. PATENT DOCUMENTS

| | | | | |
|---|---|---|---|---|
| 5,150,099 | A * | 9/1992 | Lienau | G01S 13/56 340/552 |
| 7,548,305 | B1 * | 6/2009 | Pedreiro | G01B 11/24 356/601 |
| 2011/0163905 | A1 * | 7/2011 | Denis | G01S 13/89 342/146 |
| 2015/0309161 | A1 * | 10/2015 | Giunta | G01S 7/4095 342/59 |
| 2019/0117130 | A1 | 4/2019 | Al-Alusi | |
| 2019/0250262 | A1 * | 8/2019 | Karthick Nagaraj | G01S 7/003 |
| 2020/0209382 | A1 * | 7/2020 | Iizuka | G01S 13/723 |
| 2020/0371204 | A1 | 11/2020 | Connolly | |

FOREIGN PATENT DOCUMENTS

WO  WO-2021069079 A1 *  4/2021  ........... G01B 11/005

OTHER PUBLICATIONS

"Who We Are: Our Brands," no author given; published by the Wi-Fi Alliance; Austin, Texas, USA; posted on the Internet at wi-fi.org . (Year: 2024).*
Fafoutis et al., "An RSSI-based Wall Prediction Model for Residential Floor Map Construction", Received from https://www.researchgate.net/publication/282807428_An_RSSI-based_Wall_Prediction_Model_for_Residential_Floor_Map_Construction, Dec. 2015, 7 pages.

* cited by examiner

*Primary Examiner* — Bernarr E Gregory
(74) *Attorney, Agent, or Firm* — Kilpatrick Townsend & Stockton LLP

(57) ABSTRACT

Embodiments for determine a perimeter of a physical space on an electronic device are disclosed. In an embodiment, a device has at least one radar sensor of an array of receivers arranged in a plane that sense depth via radar signal modulation and one or more processors that receive radar sensor data with the at least one radar sensor, perform a comparison between received energy level values for one or more points in a scene from the received radar sensor data, detect one or more reflector points based on the comparison and the one or more reflector points have energy level values that are higher than energy level values attributed to other points in the received radar sensor data, and determine an estimation for a perimeter of a physical space based on the one or more reflector points.

17 Claims, 17 Drawing Sheets

IDENTIFICATION OF ROOM PERIMETER USING RADAR

RELATED APPLICATIONS

This application claims the benefit of priority of U.S. Provisional Application No. 63/248,227 filed Sep. 24, 2021 which is herein incorporated by reference.

FIELD

Embodiments described herein relate to identifying a perimeter of a physical space.

BACKGROUND INFORMATION

An imaging radar may scan a room and produce a precise point cloud of measurements from which precise dimensions, locations, and orientations of the features of a room may be reconstructed. However, imaging radar require cost prohibitive antennas and cable routing to provide such features. Imaging radar also may not fit in a small form factor device. As such, other techniques are needed to identify a room without the use of imaging radars.

SUMMARY

Embodiments for determine a perimeter of a physical space on an electronic device are disclosed. In an embodiment, a device has at least one radar sensor of an array of receivers arranged in a plane that sense depth via radar signal modulation and one or more processors include a sensor processor and an application processor that receive radar sensor data with the at least one radar sensor, perform a comparison between received energy level values for one or more points in a scene from the received radar sensor data, detect one or more reflector points based on the comparison and the one or more reflector points have energy level values that are higher than energy level values attributed to other points in the received radar sensor data, and determine an estimation for a perimeter of a physical space based on the one or more reflector points and the one or more reflector points correspond to corners of a physical space. In an embodiment, the one or more reflector points are vertexes in the estimation for the perimeter of the physical space.

In another embodiment, at least one radar sensor with at least one radar sensor comprises an array of receivers arranged in a plane that sense depth via radar signal modulation, and one or more processors include a sensor processor and an application processor, where the one or more processors receive radar sensor data from the at least one radar sensor, detect at least two moving objects present in a scene using the radar sensor data, extract measurements over time from the radar sensor data for each of the at least two moving objects, perform a comparison between the measurements from the at least two objects, based on the comparison, detect one or more plane symmetric properties between the measurements that meet a threshold for identifying a reflective object, and determine a physical location for the reflective object in a physical space using the measurements. In an embodiment, the one or more processors are to extract features from the radar sensor data for each of the at least two moving objects in the scene and classify the at least two moving objects based on the set of features as a human. In yet another embodiment, the measurements are at least one of a velocity, movement, a plurality of points for an x dimension, or a plurality of points for a y dimension. In an embodiment, the one or more processors are to determine an estimation for a perimeter of the physical space based on the physical location for the reflective object.

In another embodiment, at least one radar sensor with at least one radar sensor comprises an array of receivers arranged in a plane that sense depth via radar signal modulation, and one or more processors include a sensor processor and an application processor, where the one or more processors are to receive radar sensor data from the at least one radar sensor, at a first time, detect a first moving object and a second moving object present in a scene from the radar sensor data, extract one or more measurements over time from the radar sensor data for at least one static object in the scene, process the radar sensor data by subtracting out data attributed to the at least one static object to detect extents of the first and the second moving objects, at a second time, detect a movement of the first moving object that causes a reduction in a reflection received from the second moving object in the radar sensor data, detect a pattern over time with the radar sensor data for the second moving object associated with a designation of the second moving object as a shadow, wherein the pattern comprises at least one of the second moving object is radially aligned with the first moving object or the second moving object is spatially aligned with the at least one static object, and determine a physical location for the at least one static object in a room using the measurements.

In another embodiment, at least one radar sensor with at least one radar sensor comprises an array of receivers arranged in a plane that sense depth via radar signal modulation, and one or more processors include a sensor processor and an application processor, where the one or more processors are to receive radar sensor data from the at least one radar sensor, determine a first set of convex corners for a perimeter of a physical space, determine position information for a point in a scene where at least one moving object enters or exits the scene, infer at least one of a wall or a corner for the perimeter of the physical space using the position information, and provide an estimate for the perimeter of the physical space.

In another embodiment, at least one radar sensor with at least one radar sensor comprises an array of receivers arranged in a plane that sense depth via radar signal modulation, and one or more processors include a sensor processor and an application processor, where the one or more processors are to receive radar sensor data from the at least one radar sensor, receive radar sensor data from the at least one radar sensor, determine a first set of convex corners for a perimeter of a physical space, detect a pattern in one or more velocity vectors for the at least one moving object, determine position information associated with the pattern, infer at least one of a wall or a corner for the perimeter of the physical space using the position information, and provide an estimate for the perimeter of the physical space.

In another embodiment, at least one radar sensor with at least one radar sensor comprises an array of receivers arranged in a plane that sense depth via radar signal modulation, and one or more processors include a sensor processor and an application processor, where the one or more processors are to receive radar sensor data from the at least one radar sensor, determine a first set of convex corners for a perimeter of a physical space, detect a pattern in a set of positions for one or more static objects, determine position information associated with the pattern, infer at least one of a wall or a corner for the perimeter of the physical space using the position information, and provide an estimate for the perimeter of the physical space.

DETAILED DESCRIPTION

Figure 1:
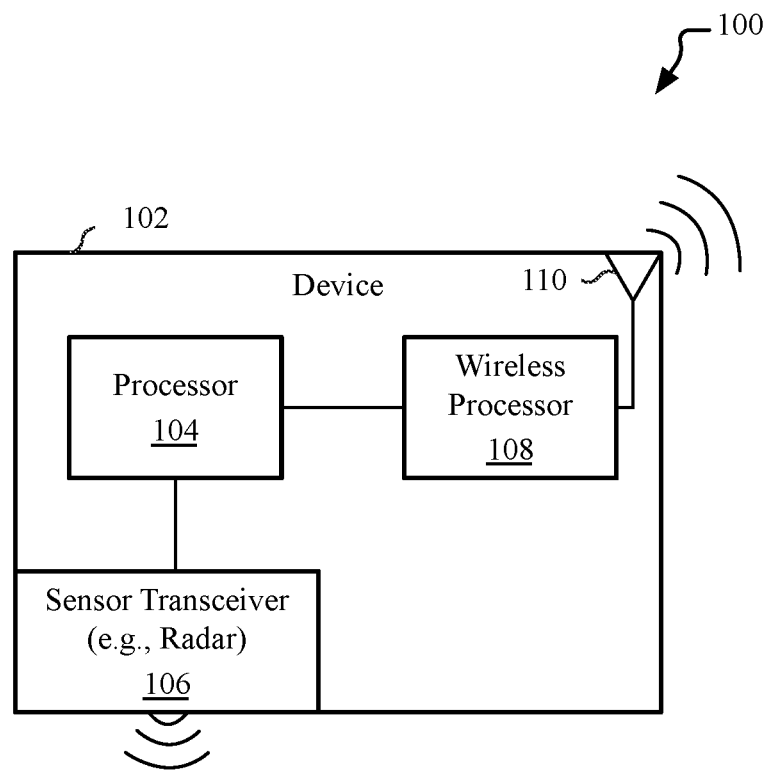
FIG. 1 is a block diagram of a network operating environment for an electronic device, according to an embodiment.

Embodiments describe techniques for identifying a perimeter of a physical space (e.g., a room, an environment, etc.) including, but not limited to, a size, a shape, and/or a type of room. The physical space is a three-dimensional expanse or area that is in field of view of a device with a radar sensor. In some embodiments, techniques are provided to define the physical space in a field of view of a radar sensor that may be insufficiently precise to perform traditional 'imaging' radar techniques either because of less technical capabilities or due to being designed for a small form factor of an electronic device. In particular, the radar sensor may either have limited capabilities or be positioned in an environment such that the sensor has reduced resolution and can only access a 'blurred' view of the physical space. In particular, the radar sensor may have one or more of the following: coarse angular precision (e.g., of the order of some tens of degrees, etc.) or steering in one of two dimensions (e.g., in a horizontal plane or a vertical plane, etc.). In yet further embodiments, the radar sensor may have difficulty resolving two adjacent objects as being distinct and/or difficulty distinguishing/resolving objects only separated in the vertical dimension (e.g., floor, wall, ceiling). As such, the radar sensor may use techniques described herein to define the physical space at least partially in the field of view.

Despite potential limitations of a radar sensor of the electronic device, the perimeter of the physical space may be sufficient for enabling a variety of uses, such as presence estimation for home automation. Presence estimation techniques are used to determine whether the physical space is occupied, the occupant location, the identity of the occupant in the physical space, and/or the type of physical space occupied. When a radar sensor is used for the purposes of presence estimation, it is useful to have a floorplan for the physical space particularly when the physical space is not entirely visible by the electronic device and/or when the perimeter of the room is not detected by the electronic device because drywall material is semi-transparent for the radar sensor thereby making identification of separate rooms difficult.

In various embodiments, description is made with reference to figures. However, certain embodiments may be practiced without one or more of these specific details, or in combination with other known methods and configurations. In the following description, numerous specific details are set forth, such as specific configurations, dimensions and processes, etc., in order to provide a thorough understanding of the embodiments. In other instances, well-known semiconductor processes and manufacturing techniques have not been described in particular detail in order to not unnecessarily obscure the embodiments. Reference throughout this specification to "one embodiment" means that a particular feature, structure, configuration, or characteristic described in connection with the embodiment is included in at least one embodiment. Thus, the appearances of the phrase "in one embodiment" in various places throughout this specification are not necessarily referring to the same embodiment. Furthermore, the particular features, structures, configurations, or characteristics may be combined in any suitable manner in one or more embodiments, embodiments.

FIG. 1 is a block diagram of a network operating environment 100 for an electronic device 102, according to an embodiment. The electronic device 102 can be a variety of electronic devices, such as a smart speaker device, television, smartphones, laptops, computers, notebooks, gaming systems, head-mounted displays, or television set top box. Aspects of the electronic device 102 may also be found in other electronic devices, such as smart home appliances and electronic devices. Exemplary smart home appliances and electronic devices include thermostats, refrigerators, washers, dryers, lighting control systems, and the like. In some embodiments, the electronic device 102 may be a vehicle.

In one embodiment the electronic device 102 includes a processor 104 having multiple processor cores. The processor cores can enable the processor 104 to function as one or more of the following: an application processor, a signal processor, a sensor processor, and a secure processor. The electronic device 102 can also include a wireless processor 108 coupled with an antenna 110. The wireless processor 108 can enable the electronic device 102 to communicate over a wireless network, such as but not limited to a Wi-Fi network, Bluetooth personal area network, or mobile data network (e.g., long-term evolution (LTE), 5G, etc.).

The electronic device 102 can also include one or more sensor transceivers 106A. Although one sensor transceiver/receiver is shown in FIG. 1, those with skill in the art will recognize any number of sensors and any number of sensor types may be used. In one embodiment, the sensor transceiver 106 is a low power radar sensor that enables the electronic device 102 to determine and/or infer the perimeter of a physical space in a field of view of the sensor 106. The field of view of the sensor transceiver 106 can vary based on the type of sensor. In one embodiment, the sensor transceiver 106 is a mm Wave radar sensor (e.g., 60 GHz radar, 10 Ghz radar, etc.).

In some embodiments, the sensor transceiver 106 may have angular resolution in one dimension (e.g., either vertical or horizontal dimensions). By way of example, it may be beneficial for cost, size, and/or power constraints to have the sensor transceiver with a linear array of receivers (e.g., antennas) arranged in a horizontal plane. The sensor transceiver may "steer" the radar beam in the horizontal plane (referred to as an azimuth angle) and can sense depth via radar signal modulation (e.g., frequency modulated continuous wave). The azimuth angle is an angular measurement in a coordinate system (e.g., horizontal, spherical, etc.). Steering is the ability to focus emitting a pulse of energy and may be used to determine how long it takes to receive a reflection back from a particular point. In some embodiments, as a cost saving measure, "steering" may involve using a broad beam of energy emitted by the sensor transceiver 106 as opposed to having the capability of focusing or pinpointing of a pulse of energy.

In one embodiment, the ability to resolve, estimate the position, and/or determine the movement of objects within the environment of the electronic device 102 can be improved by combining sensor data from multiple devices. Multiple radar equipped electronic devices 102 may communicate over a network to share radar sensor data, identity data, processed data, motion model data, voiceprint data, and/or any other type of data between the devices. The communication can be performed wirelessly via a network connection that is enabled via the wireless processor 108. Each instance of the electronic device 102 can combine local sensor data with remote sensor data received from other devices to increase the angular resolution of the detected sensor data. In an embodiment, the various electronic devices 102 may be multiple instances of the same type of device. Different types of electronic devices may also interact, where each device is capable of communicating wirelessly with other devices and has a sensor transceiver 106 that is able to gather sensor data about the spatial environment around the device. While radar is given as an example type of sensor, other types of sensor data can also be fused across multiple devices. For example, sensor data from lidar sensors or ultrasonic sensors may also be fused.

Microphone receiver 112 and speech sensor transceiver 106B and optionally, speech sensor receiver 107 may be used to measure voice. Although FIG. 1 shows one microphone receiver, those with skill in the art will recognize that any number of microphone receivers 112 and multiple microphones may be used. In an embodiment, the electronic device 102 has a second radar sensor with speech acquisition sensor transceiver 106B and optionally, a sensor receiver 107 that are high frequency millimeter-wave (MMW) radar sensors that enable the detection of speech signals, such as a 94-GHz MMW radar sensor. Although a particular radar sensor is provided as an example, those with skill in the art will recognize that other carrier frequencies (e.g., higher carrier frequencies ranging from 75-110 GHz, 5 GHz to 12 GHz (UWB band), 57-64 GHZ, −120-132 GHz, 240 GHz, etc.) may provide enough range and sensitivity to acquire data. In an embodiment, a speech sensor receiver 107 (e.g., superheterodyne receiver) is used to ensure small sound vibrations and relative motion can be detected on the surface of a body. In an embodiment, an advantage with the use of the speech sensor transceiver 106B may be the depth and angle precision achieved for detecting moving objects and identifying speakers in the room. Speech sensors may more accurately detect the position of a speaker in the room when the room is noisy and/or when at least one device used to detect a speaker is making noise itself potentially interfering with detection of a proximity of a speaker. Processor 104 may be used to process the received radar data from transceiver 106B/107 to produce time series data and/or analysis. Time series data is a collection of measurements captured over time and analysis of the data may provide statistics or characteristics of the data using the measurements.

Embodiments may have one or more microphone receivers (not shown) for receiving audio data. The microphone receiver may detect speech signals from the motion of air particles when air is spread via an air medium. The microphone receiver measures air pressure variations. Received audio data is compared against voiceprints associated with user profiles to identify and/or authenticate a user using their voice pattern and determine an identity for the user. Authentication is the verification of a given or purported identity whereas identification is determining an unknown identity.

Voiceprints encompass recognized patterns in audio received from a user using at least one acoustic capture method (e.g., use of a microphone) as opposed to non-acoustic methods. By way of example, acoustic feature vector (e.g., frequency data) may be obtained and analyzed to recognize a pattern in speech for a user to serve as the voiceprints. In some embodiments, the voiceprints are a representation of frequencies of a signal over time. Processor 104 may be used to process the received audio data and/or voiceprints to produce time series displacement data. Once humans are identified in the scene, various use cases involving accessing data or services available with a user account corresponding to the particular identity for the human to personalize the experience of interacting with a device may be realized.

Figure 2:
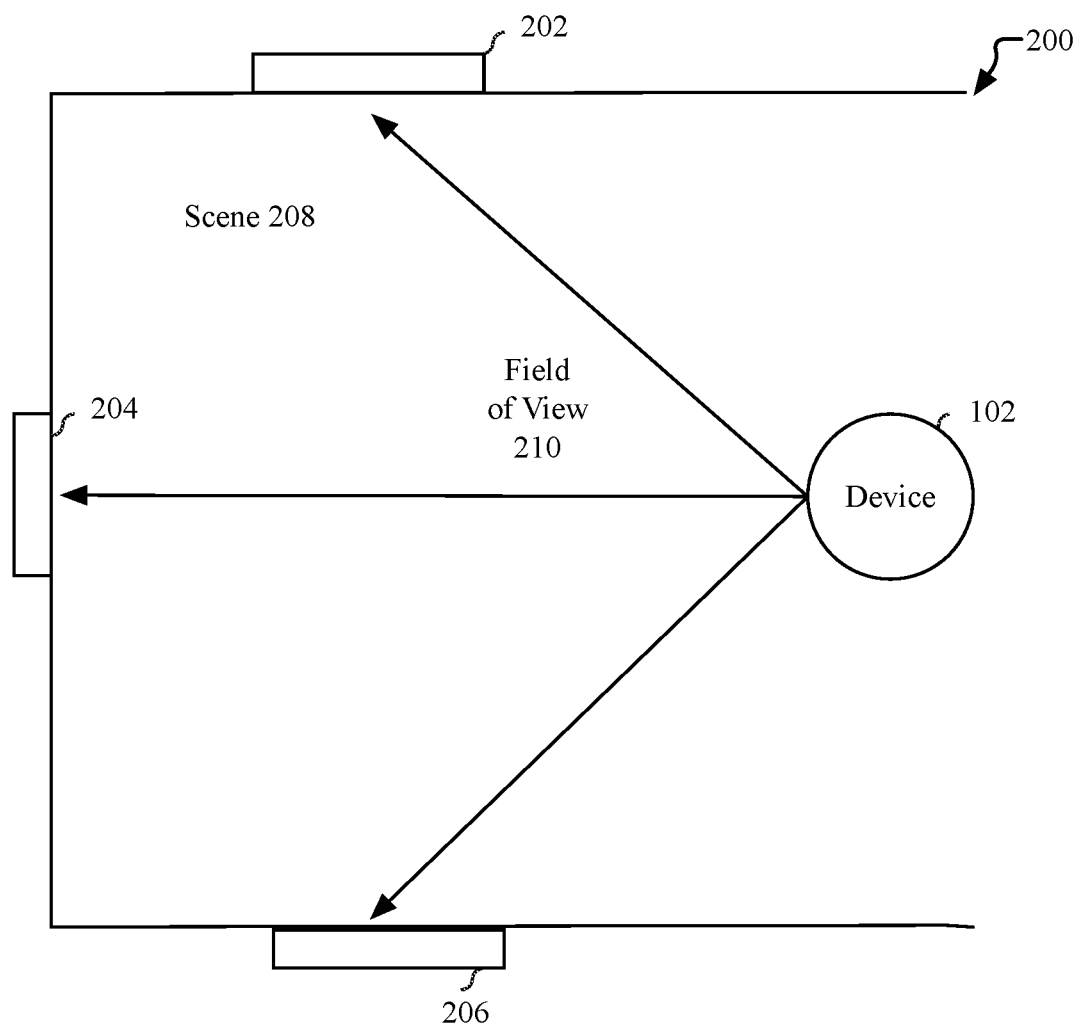
FIG. 2 is a block diagram of an electronic device in an environment, according to an embodiment.

FIG. 2 is a block diagram 200 of an electronic device 102 in an environment, according to an embodiment. In an embodiment, the electronic device 102 may have a radar sensor 106 with depth and azimuth resolution capabilities, and no ability to steer in the vertical dimension (e.g., up or down). In such an embodiment, the radar sensor 106 may observe all reflections in the field of view 210 at a given azimuth and a given range as being in the same place. That is, the radar sensor 106 may perceive a three-dimensional world as a projection into a single horizontal plane, where it can only distinguish and provide data on objects including the range and the azimuth. For example, such a radar sensor 106 may not be able to distinguish a reflection from a portion of the ceiling 202 at a given azimuth and range, from a portion of a wall 204 at the same angle and range, or from a portion of the floor 206 at the same angle and range because the radar sensor 106 has no concept of the vertical dimension (e.g., a sense of up or down, etc.).

When a radar sensor 106 illuminates a scene 208, it may receive a reflection from static reflectors (illustrated with portions 202, 204, and 206) from many angles and many ranges. Some of these reflections may correspond to walls, and others may simply be floor and ceiling reflections. Similarly, if the wall 204 is at a shorter range to the radar sensor 106 than the ceiling 202 and floor 206, then the radar sensor 106 can measure only the wall and yet the electronic device 102 utilizing the radar data from the radar sensor 106 has no way of determining that it is the wall being observed, as opposed to floor and ceiling reflections.

Typically, static reflectors are collectively known as "clutter" and are generally removed from the radar measurements leaving behind only moving reflectors in the scene. For the purposes of indoor person tracking, removal of clutter is often beneficial for tracking moving objects. Techniques are described herein can enable a radar sensor 106 to determine whether a given static object reflection corresponds to a wall, as opposed to the ceiling or the floor.

Figure 3:
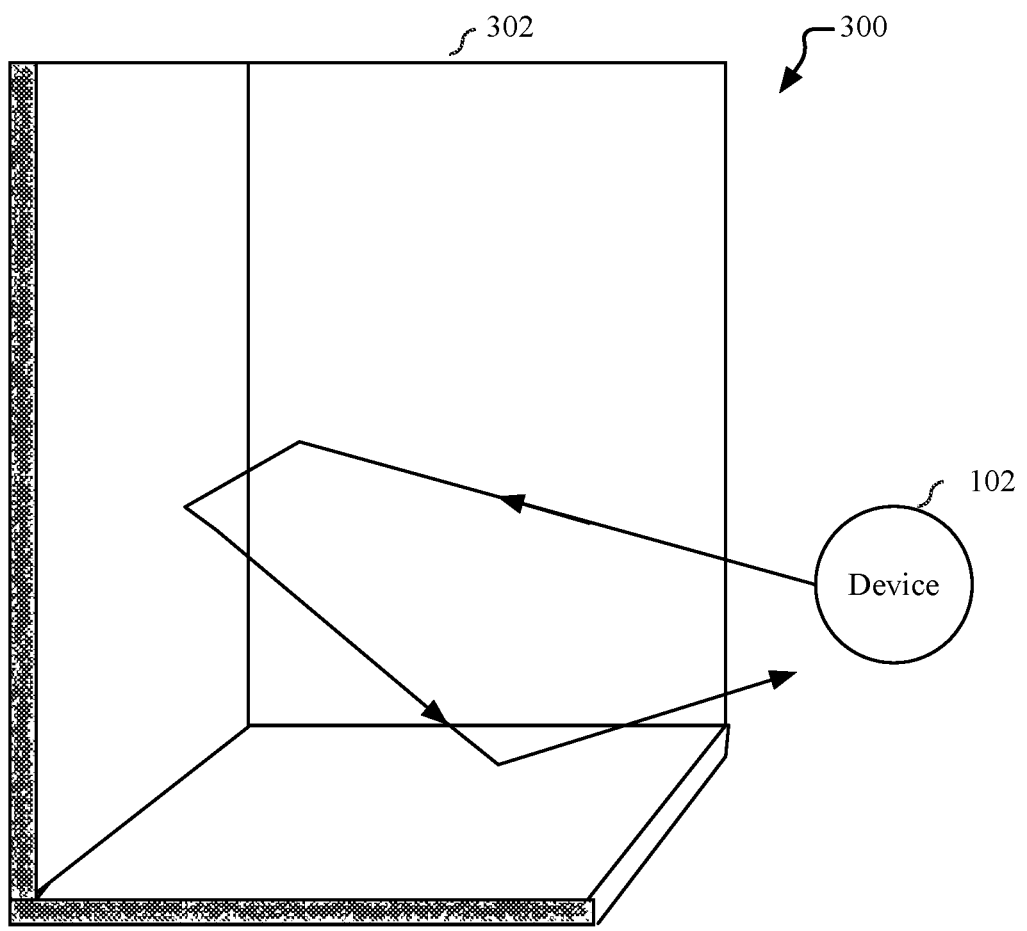
FIG. 3 is a block diagram of an electronic device in an environment, according to an embodiment.

FIG. 3 is a block diagram of an electronic device 102 in an environment 300, according to an embodiment. Electronic device 102 is illustrated with a physical space 302 in the field of view of the radar sensor 106 of the electronic device 102. Typically, when an object is illuminated by a radar, it will reflect energy in all directions. Some of this energy will be reflected back to the radar, which will detect this energy, thereby allowing the radar to 'observe' the object. The amount of energy reflected may depend on the physical size of the object, what material the object is made from, and the shape of the object. Walls and floors in a physical space 302 may not be particularly reflective to radar sensor 106 signals (e.g., mmWave radio signals, etc.), but due to the size, the walls may still represent a large portion of the reflected energy received by the radar sensor 106 in a typical indoor scene 208. In some embodiments, the energy reflected by the walls and measurements received by the radar sensor 106 may not be uniform. Characteristics of the wall geometry may result in localized peaks in the energy reflected back to the radar sensor 106.

In some embodiments, a room of the physical space 302 will exhibit features that closely resemble "corner-reflectors" or "retroreflectors". As shown in FIG. 3, there are portions of the room of the physical space 302 where three planes meet perpendicularly and the reflection received may behave as the radio-frequency analogous to a prism for light, where the incident energy is reflected directly back at the radiating source (e.g., the radar sensor 106).

In the physical space 302, two walls may meet at nearly right angles (e.g., 90 degrees) with each other, and similarly may meet either the floor or ceiling, or both, again at right angles. When illuminated, as shown, concave corners of a room may be 'naturally occurring' corner reflectors and the corner reflectors may produce a noticeably high energy values received by the radar sensor 106, relative to the surrounding scene 208. By observing the scene 208, when it is unoccupied, the locations of these high energy reflectors can be readily identified. An example of received sensor data from a room with corners is shown below in FIGS. 4A-4B.

Figure 4A:
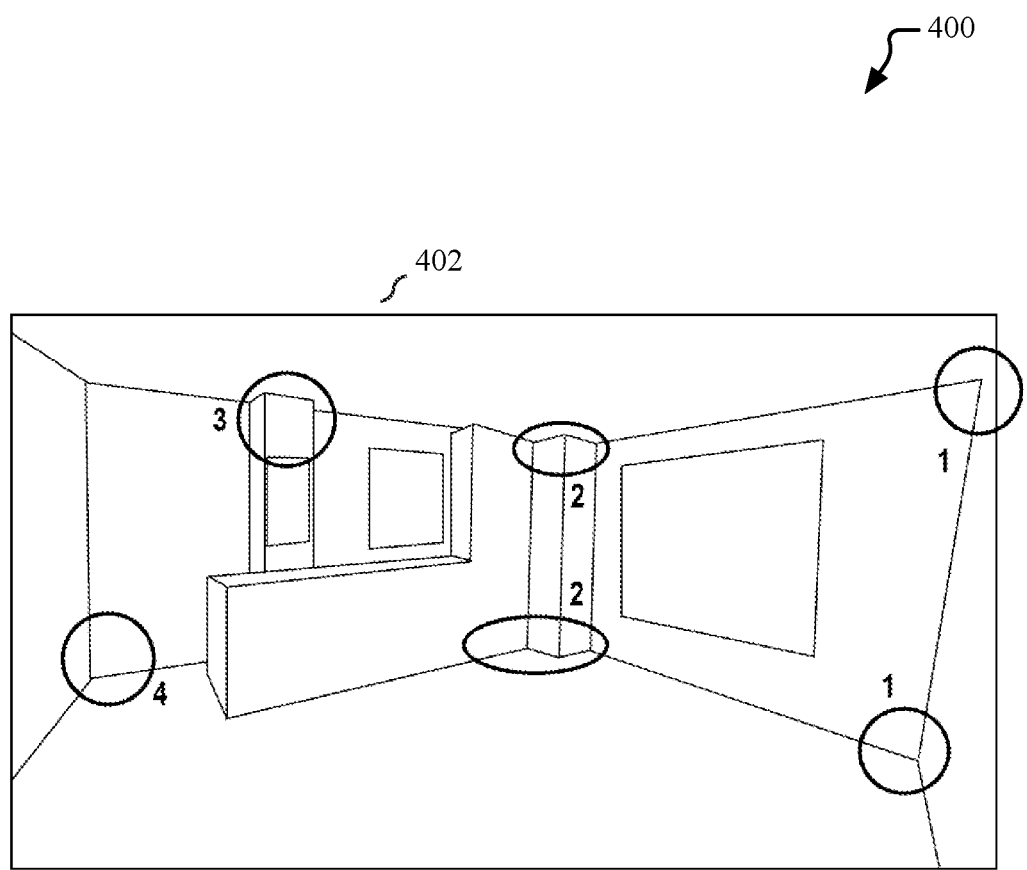
FIG. 4A is a block diagram of a physical space, according to an embodiment.

FIG. 4A is a block diagram 400 of a physical space 402, according to an embodiment. As illustrated in FIG. 4A, radar sensor 106 of electronic device 102 receives radio signals back from points 1-4 in physical space 402 that have high energy values relative to energy levels received from other points in the physical space 402.

Figure 4B:
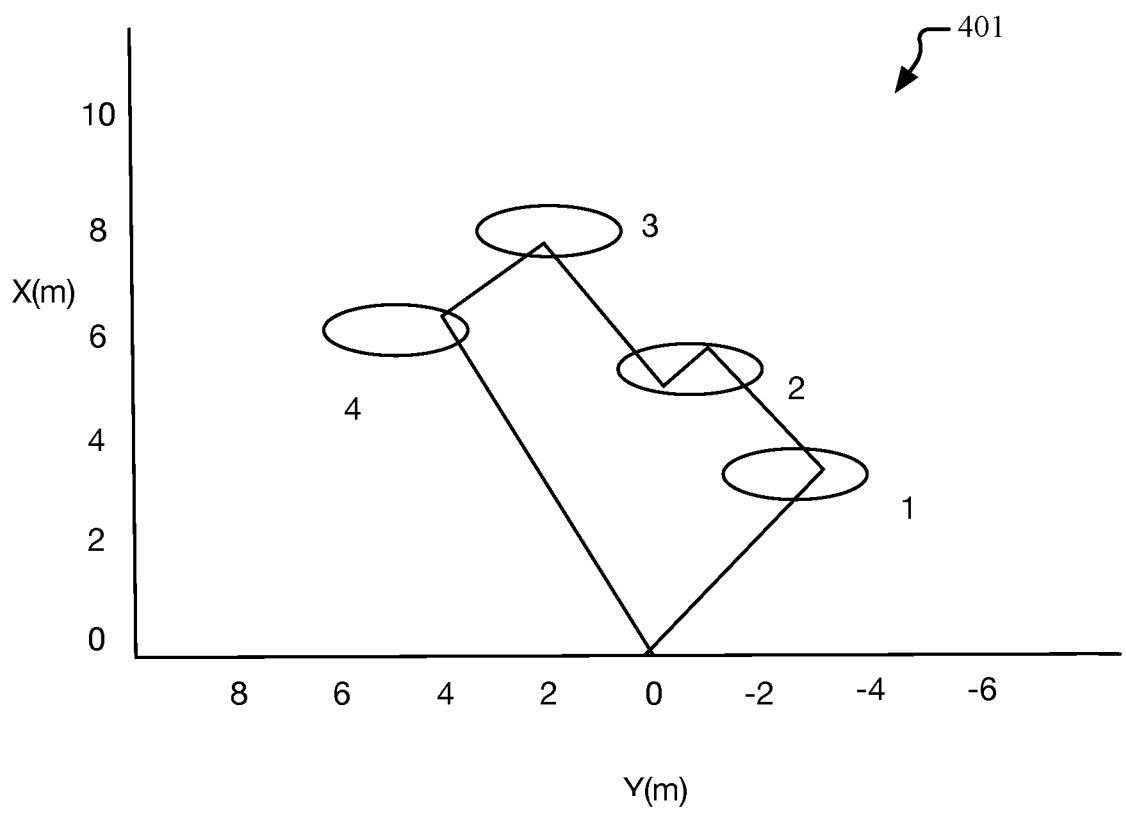
FIG. 4B is a graph with exemplary received sensor data from an electronic device in a physical space, according to an embodiment.

FIG. 4B is a graph 401 with exemplary received sensor data from an electronic device 102 in a physical space 402 as shown FIG. 4A, according to an embodiment. As illustrated, points 1-4 in a coordinate system of graph 401 represent areas of a scene 208 where sensor data was received by a radar sensor 106 (radar sensor is positioned at point 0 on the y axis) with relatively high energy values as compared to points from other received sensor data from the scene 208. The received sensor data may be used to create an estimation or an approximation for the perimeter of the physical space 402. As indicated above, points in space with relatively high energy values in received sensor data are determined to be convex corners with angles observed at or near right angles. In some embodiments, an estimation for the perimeter of the physical space 402 is determined by assigning each point in space with high energy values received by the radar sensor 106 to be a vertex in the estimation of the perimeter for the physical space.

Figure 5:
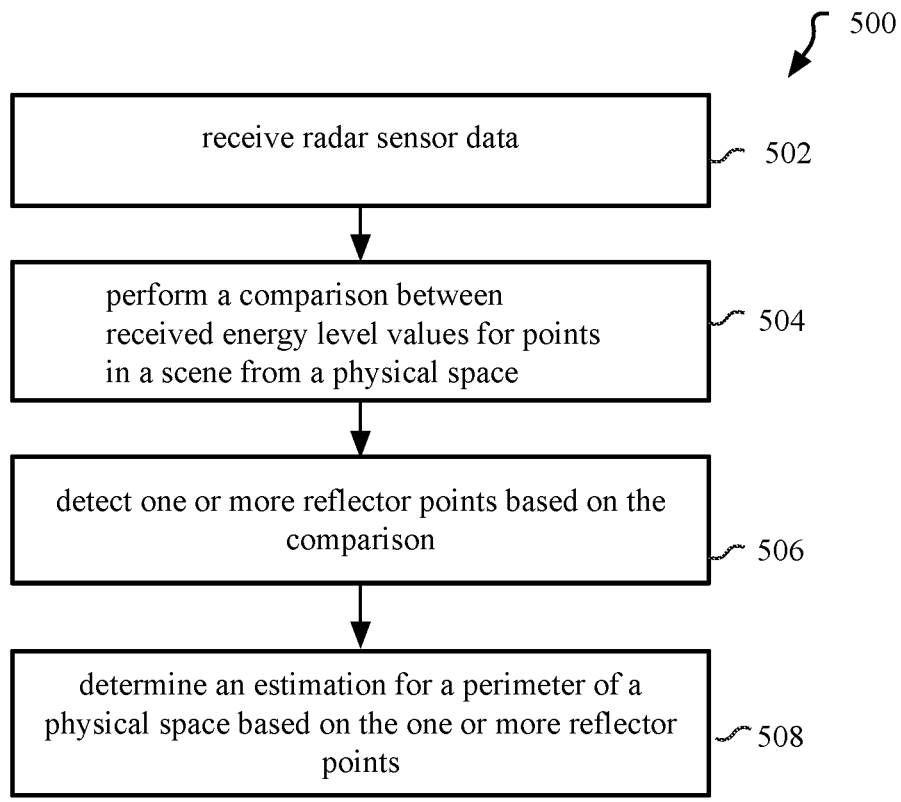
FIG. 5 is a flow chart for an exemplary method for determining a perimeter of a physical space, according to an embodiment.

FIG. 5 is a flow chart for an exemplary method for determining a perimeter of a physical space, according to an embodiment. Radar sensor data may be received by at least one radar sensor (502). A linear array of radar sensor receivers of the electronic device 102 are arranged in a horizontal plane. The radar sensor receivers 106 are capable of sensing depth via radar signal modulation to determine points (e.g., positions mapped to a coordinate system) within the physical space, as shown in FIGS. 4A-B.

A comparison is performed between received energy level values for points in a scene from a physical space (504). One or more reflector points are detected based on the comparison (506). The received radar sensor data corresponding to the one or more reflector points have values for energy levels that are relatively higher than energy levels from other points in received radar sensor data. In an embodiment, the energy level meets a threshold value above other energy level values for points from radar sensor data for the physical space.

An estimation for a perimeter of a physical space is determined based on the one or more reflector points with the one or more reflector points corresponding to corners of a physical space (508). After the corners are located for a physical space, techniques are used to determine the shape of the walls in order to provide an estimation for the perimeter by connecting the corners.

Figure 6A:
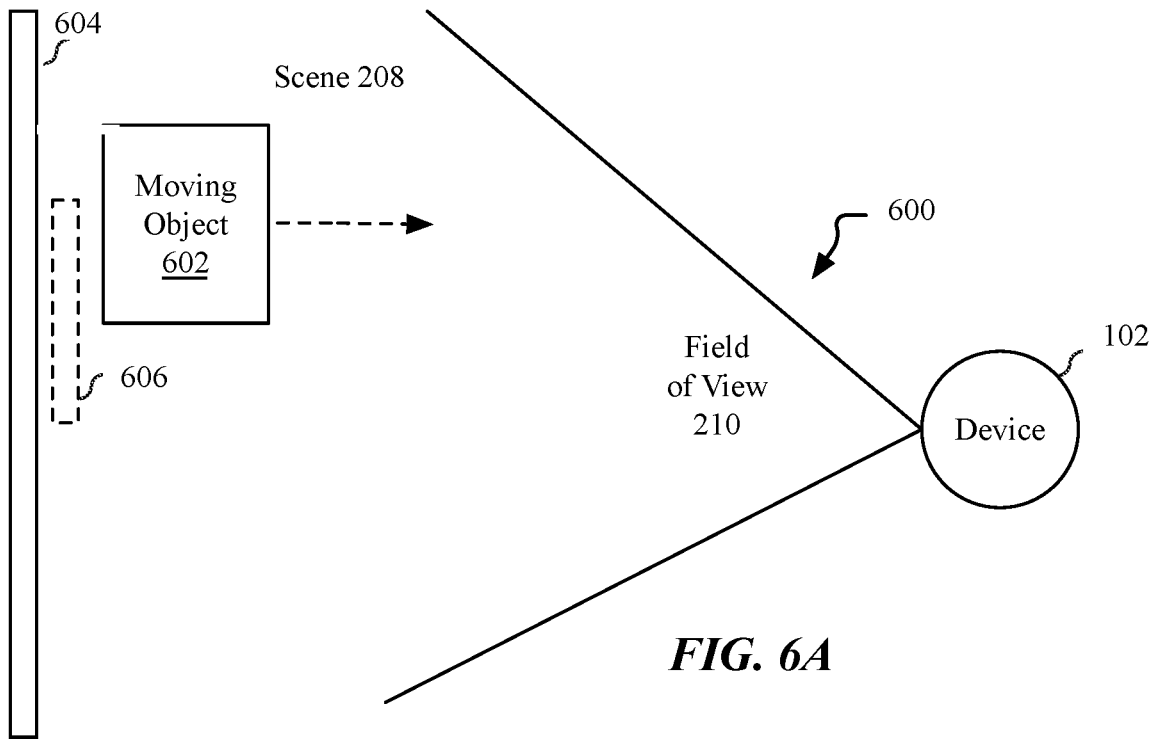
FIG. 6A is a block diagram of an electronic device in an environment, according to an embodiment.
Figure 6B:
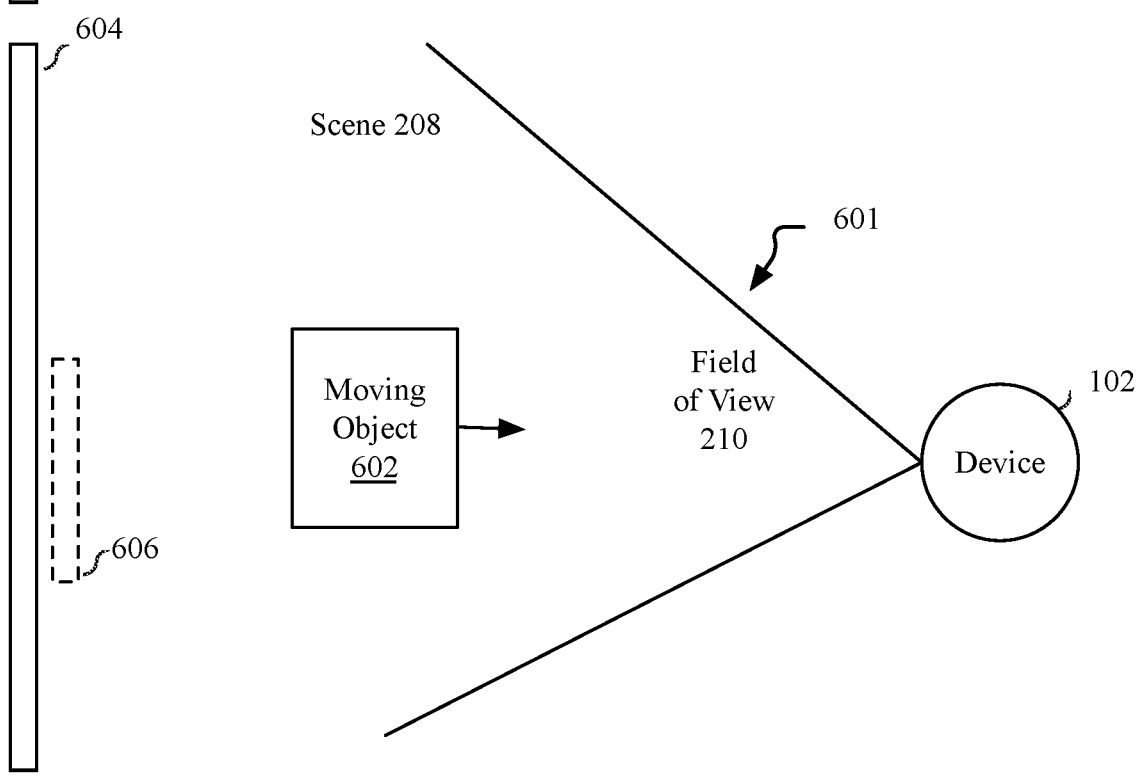
FIG. 6B is a block diagram of an electronic device in an environment, according to an embodiment.

FIG. 6A and FIG. 6B are block diagrams 600 and 601, respectively, of an electronic device 102 in an environment, according to an embodiment. Block diagrams 600 and 601 illustrate electronic device 102 at two points in time as a first moving object 602 is moving away from a wall 604 with a reflective surface (e.g., a mirror, glass, television screen, a window, etc.) such that a reflection (e.g., second moving object 606) for the moving object 602 may be detected within the field of view 210 of the radar sensors 106 of the electronic device 102. Both the moving object 602 and the reflection (e.g., second moving object 606) are perceived as moving objects within the scene 208. The electronic device 102 can determine direction, radial velocity, and/or range measurements for the moving objects (e.g., 602 and 606) as the object moves, and the sensor 106 measurements can be used to calculate a motion vector (e.g., speed and direction) for each object 602 and 606 in order to generate a motion model for each of the detected moving objects. The radial velocity of an object with respect to a given point (e.g., the electronic device) is the rate of change of the distance between the object and the point. The radial velocity is the component of the object's velocity that points in the direction of the radius connecting the point and the object.

The motion model can then be used to estimate the objects position within the scene. For example, the path of the first object 602 while within the field of view 210 can be used to calculate a motion vector for the first object 602 and the path of the first object 602 while within the field of view 210. The motion vectors can be a mathematical model that describes the observed motion of the object through space. The motion vector may be used to estimate a future position of the object, assuming the object does not significantly change the direction or speed of its motion after leaving the field of view 210 of the sensor first electronic device 102.

When processing radar sensor data, the moving objects 602 and 606 in the scene 208 are detected and their position over time is estimated and tracked by the radar sensor 106. In cases where there is a large mirror on the wall 604 in the scene, for example, in a bedroom or living room, the radar 106 may track what appears to be two moving objects 602 and 606 (e.g., person and reflection) in the physical space. In such a case, one tracked entity is the person (first moving object 602), while the second tracked entity is simply the reflection (second moving object 606) of the person in the mirror on wall 604. In some embodiments, the radar signals received (by the radar sensor 106) may be reflected in a specular manner, similar to visible light, and the 'image' of the person in the mirror 606, as perceived by the radar sensor 106, will be analogous to the visible image of a person in a mirror.

Figure 7A:
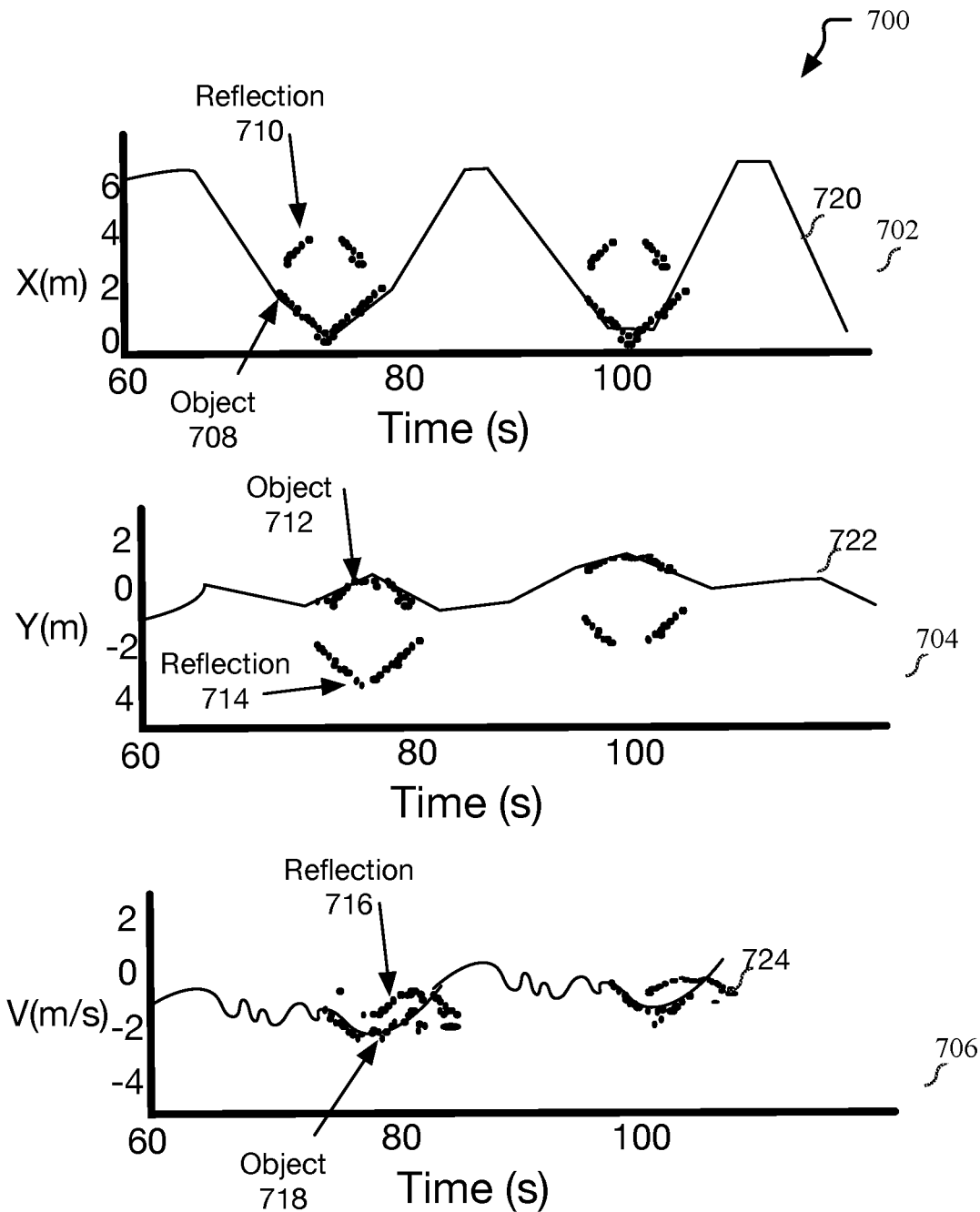
FIG. 7A is a set of exemplary plots for a technique to determine a perimeter of a physical space, according to an embodiment.

FIG. 7A is a set of exemplary plots for a technique to determine a perimeter of a physical space, according to an embodiment. The first two subplots 702 and 704 depict the horizontal dimensions, x, y, respectively, while the third subplot 706 depicts the radial velocity between the moving objects 602 and 606 and the radar sensor 106 of electronic device 102. The curves 720, 722, and 724 in each subplot represents the true position (x, y) and velocity (v (m/s)), respectively, of the first moving object 602 (e.g., person). The markers/points for the moving object 602 (708, 714, and 718) and the reflection 606 (710, 712, and 716) represent instantaneous measurements made by the radar sensor 106. The measurements are recorded with respect to the electronic device 102 radar sensor 106 located at x=0 and y=0.

A trend is visible in the markers for the plot of the reflection 606 which appears to exhibit symmetry with the truth reference for the object. Taking the x dimension, as an example, when the first moving object (e.g., person) 602 represented by 708 approaches the radar (x approaches 0) the markers for the second moving object (e.g., reflection) 606 (as shown in the plot with 702) move away from 0. This corresponds to a scenario where person is located between the radar sensor 106 and the mirror and may block the radar sensor from detecting the reflection. As the first moving object (e.g., person) 602 moves towards the radar 106, and therefore away from a mirror at 604, the reflected person (e.g., second moving object (e.g., reflection) 606) recedes further into the mirror, and therefore further from the radar 106.

A similar effect is visible in the Y dimension corresponding to moments where the reflective object (e.g., mirror) was occluded by the person 602 completely occupying the field of view of the radar. During periods of time in which the first moving object (e.g., person) 602 is moving towards or away from the radar, the plot for the velocity 706 also exhibits an equal but opposite velocity trend, corresponding to the reflection. For reflective surfaces, the movement over time is symmetric between the first moving object (e.g., person) 602 and the second moving object (e.g., reflection) 606 and an inference can be made that one is a person and one is the reflection of this person when such symmetric properties are detected. After an inference is made that the presence of a reflective object (e.g., a large mirror) is in the scene 208, another inference can be determined that the reflective object is a flat surface on a wall potentially providing enough information for connecting the identified vertices from the method to provide an estimation of the perimeter for the physical space as described in FIG. 5.

A particular type of geometric symmetry that may be observed in the subplots is "plane symmetry." The location of the plane, about which the movement is symmetric, is the physical location and orientation of the mirror. Noting that, with a very high likelihood, reflective objects, such as large mirrors and/or televisions are mounted on the perimeter of a room, either on a wall, or as part of a wardrobe/closet, the location and orientation of a portion of one wall or one segment of the room perimeter, can be determined.

Figure 7B:
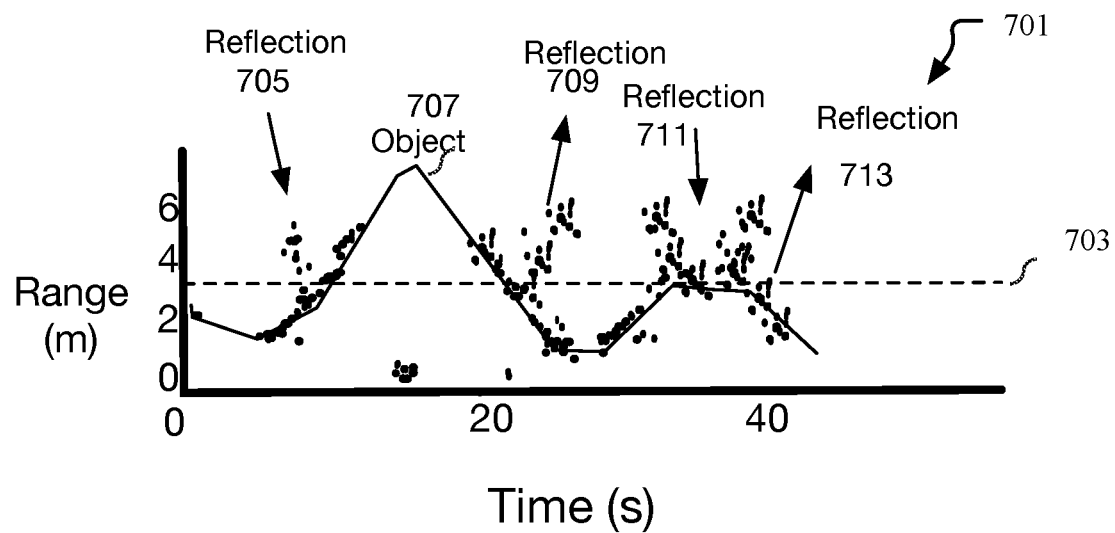
FIG. 7B is an exemplary plot for a technique to determine a perimeter of a physical space, according to an embodiment.

FIG. 7B is an exemplary plot 701 for a technique to determine a perimeter of a physical space, according to an embodiment. The subplot in 701 depicts the range (m) over time with reflective object location designated with 703. In 701, as the first moving object 602 (depicted with line 707 and markers on or near line 707) moves away from the reflective object on wall 604, the reflection markers for the plot the second moving object 606 (e.g., reflection) illustrate that the second moving object 606 appears to move further into the scene 208 (as shown with 705, 711) as detected by the radar sensor 106 of electronic device 102. Alternatively, as the first moving object 602 (depicted with line 707 and markers on or near to line 707) moves out of the scene 208, the reflection markers for the plot the second moving object 606 illustrate that the reflection appears to move further out of the scene 208 (as shown with 709, 713) as detected by the radar sensor 106 of electronic device 102.

Figure 8:
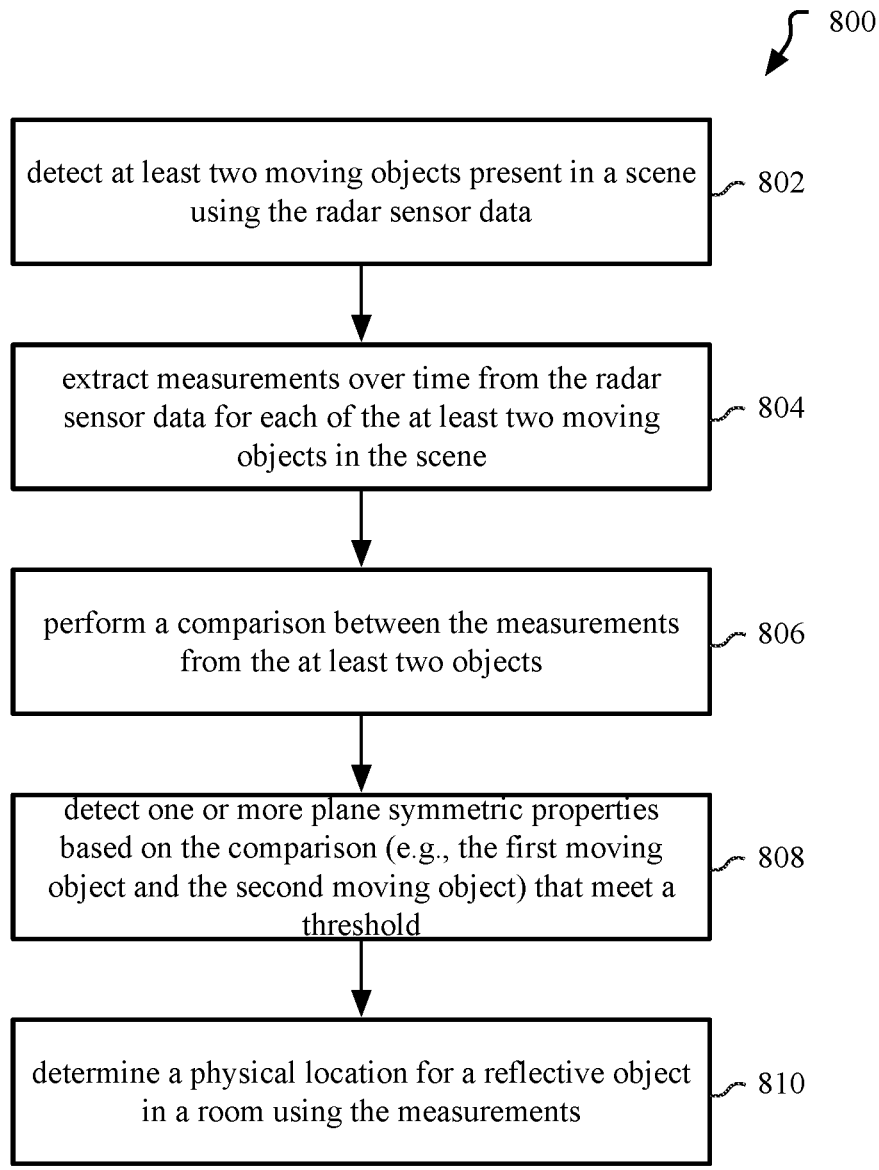
FIG. 8 is a flow chart for an exemplary method for determining a perimeter of a physical space, according to an embodiment.

FIG. 8 is a flow chart for an exemplary method for determining a perimeter of a physical space, according to an embodiment. Radar sensor data may be received by at least one radar sensor. A linear array of radar sensor receivers of the electronic device 102 are arranged in a plane. The radar sensor receivers 106 are capable of sensing depth via radar signal modulation to determine points (e.g., positions mapped to a coordinate system) within the physical space. At least two moving objects may be detected in a scene based on the radar sensor data (802). Measurements over time may be extracted from the radar sensor data for each of the at least two moving objects in the scene (804). A comparison between the measurements from the at least two objects is performed (806). Based on the comparison, one or more plane symmetric properties may be detected between the first moving object and the second moving object that meet a threshold (808). If there are sufficient symmetric properties between the moving objects that meet or exceed a threshold value, then a physical location for a reflective object in a room may be determined based on the measurements (810).

Figure 9A:
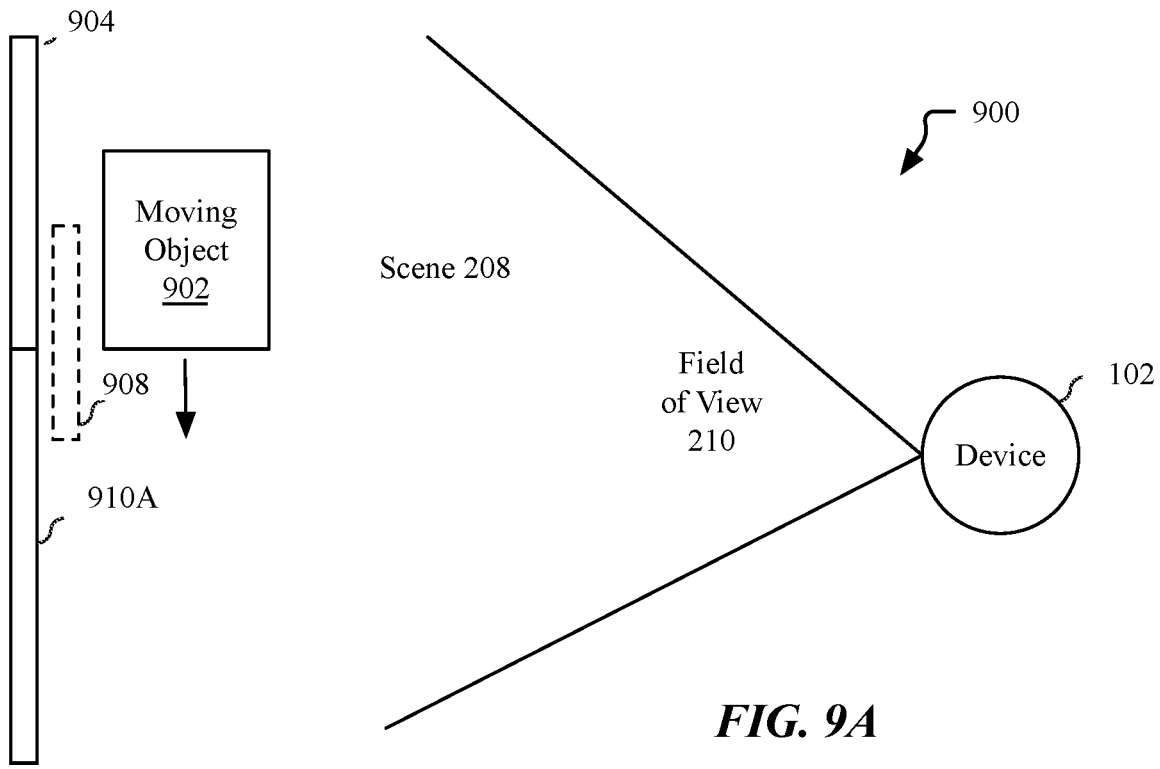
FIG. 9A is a block diagram of an electronic device in an environment, according to an embodiment.
Figure 9B:
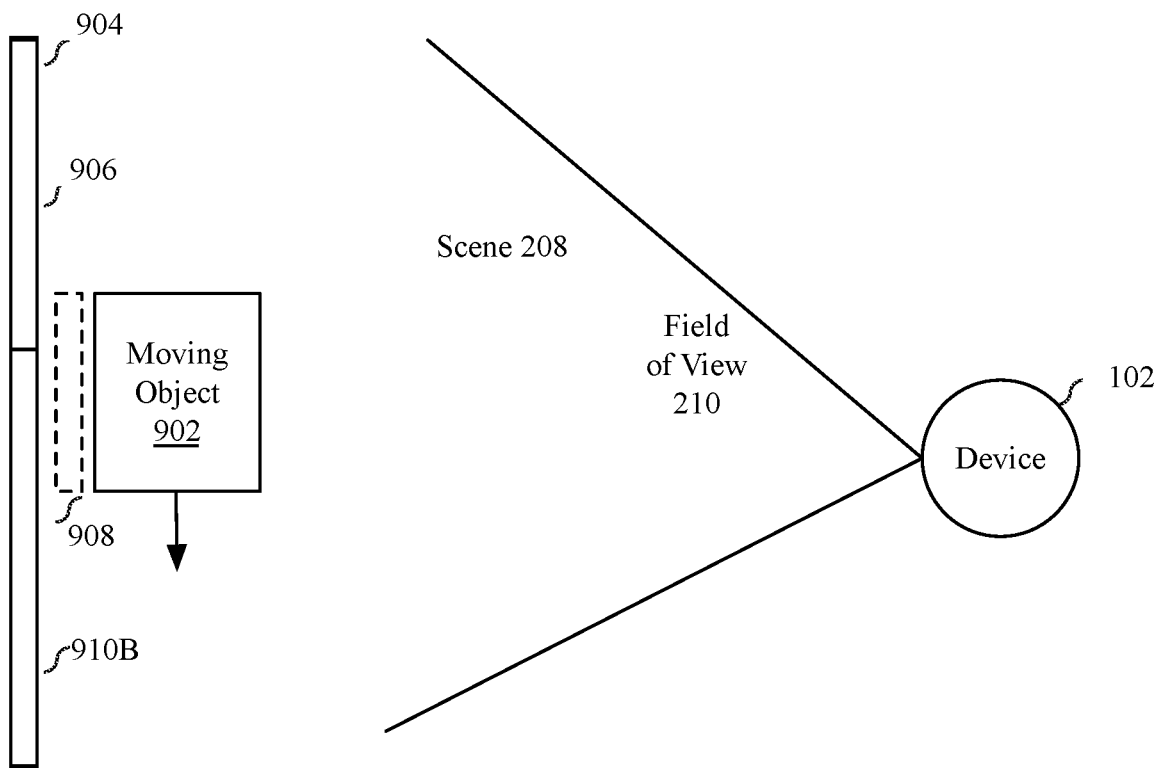
FIG. 9B is a block diagram of an electronic device in an environment, according to an embodiment.

FIGS. 9A and 9B are block diagrams 900 and 901 of an electronic device in an environment, according to an embodiment. Block diagrams 900 and 901 illustrate a scene captured by the field of view of electronic device 102 at two points in a window time as moving object 902 (e.g., a person) is moving in front of a static object 904 and moving object 902 casts a shadow 908 on static object 904. In this example, static object 904 is a wall in a physical space.

To capture the various states of the moving object 902 in the scene 208 within the field of view 210 of the radar sensor 106, constant reflections returned from static objects (e.g., "clutter") present in the scene 208 are removed during processing of the received radar sensor data. With the radar sensor 106, it can be difficult to disambiguate between the shadow 908 and the moving object 902. During processing of the radar sensor data, measurements (e.g., time series data) are observed and aggregated over a window of time in order to make an inference as to the location of static objects 904 and moving objects 902 in the scene 208. Stable, non-time varying reflections may be attributed to static objects 904.

In the case of a shadow 908, a moving object 902 can block the radar signal from hitting static objects 904, such as walls, and can cause the shadow 908 on the static object 904. With static objects 904, such as walls, a distinct pattern in the time series data may be observed. The shadow 908 detected may be radially aligned with the moving object 902 in the foreground of the scene 208 and spatially aligned with the static object 904 where a stable, strong reflection from the static object 904 had previously been received. For example, as shown on wall 904 over time in FIGS. 9A and 9B, when moving object 902 moves, portion 910A of static object 904 produces stable and strong reflections captured by radar sensor 106 in diagram 900 until moving object 902 causes shadow 908 and the radar sensor 106 receives a reflection for the shadow 908 and the moving object 902. As moving object 902 moves toward being located directly or nearly in front of the electronic device 102, the shadow 908 shrinks in size or is not visible. An inference can be made based on the pattern in the received sensor data that can be attributed to the shadow 908 was created on static object 904 is also a wall.

Figure 10:
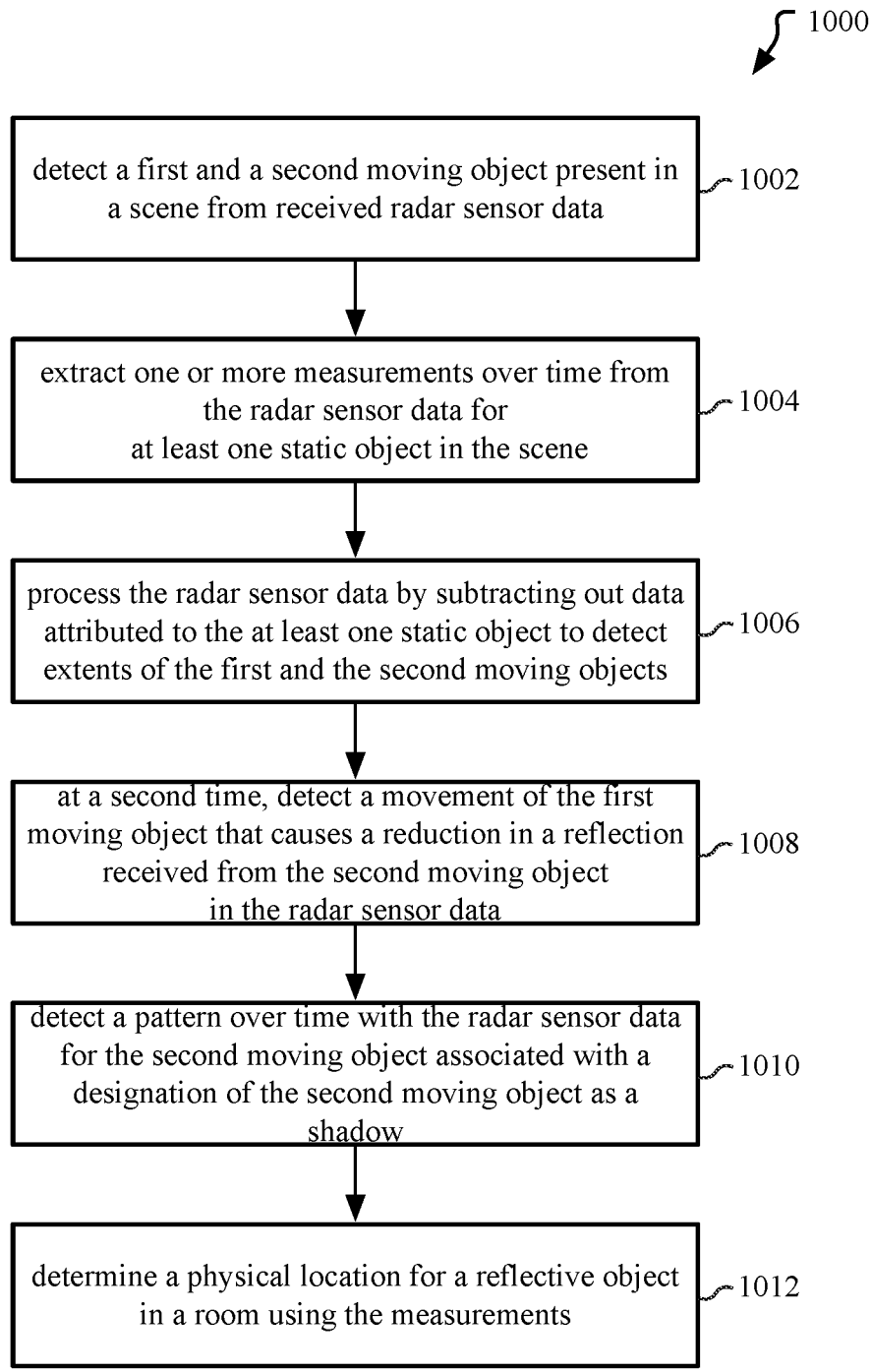
FIG. 10 is a flow chart for an exemplary method for determining a perimeter of a physical space, according to an embodiment.

FIG. 10 is a flow chart for an exemplary method 1000 for determining a perimeter of a physical space, according to an embodiment. Radar sensor data may be received by at least one radar sensor 106. A linear array of radar sensor receivers of the electronic device 102 are arranged in a plane (e.g., a horizontal plane). The radar sensor receivers 106 are capable of sensing depth via radar signal modulation to determine points (e.g., positions mapped to a coordinate system) within the physical space.

At a first time, a first moving object and a second moving object are detected in a scene from the radar sensor data (1002). The shadow for the first moving object may be detected as a second moving object from the received sensor data. One or more measurements over time are extracted from the radar sensor data for at least one static object in the scene (1004). Measurement data for the static objects (e.g., walls) are used to determine the extents of the moving objects. The received radar sensor data is processed by subtracting out data attributed to the at least one static object with a constant reflection to detect extents of the first and the second moving objects (1006).

At a second time, a movement of the first moving object is detected that causes a reduction in a reflection received from the second moving object in the radar sensor data (1008). When the first moving object (e.g., a person) moves closer to being directly in front of the electronic device 120, the reflection from the second moving object (e.g., the shadow) is reduced. When the shadow is not reflected, then an inference is made that the first moving object is positioned directly in front of the reflective object. In some embodiments, the moving object may be tracked with a motion model and the positioning information from the motion model may be used to determine the position information for the wall with the reflective object. Some embodiments may use the measurement information for extracted from the radar sensor data to determine the position for the wall with the reflective object when the first moving object is in front of the reflective object.

A pattern is detected over time with the radar sensor data for the second moving object associated with a designation of the second moving object as a shadow (1010). The pattern for detecting that the second moving object is a shadow is (1) determining the second moving object is radially aligned with the first moving object or (2) the second moving object is spatially aligned with the at least one static object. A physical location for a reflective object in a room may be determined using the measurements (1012).

Figure 11:
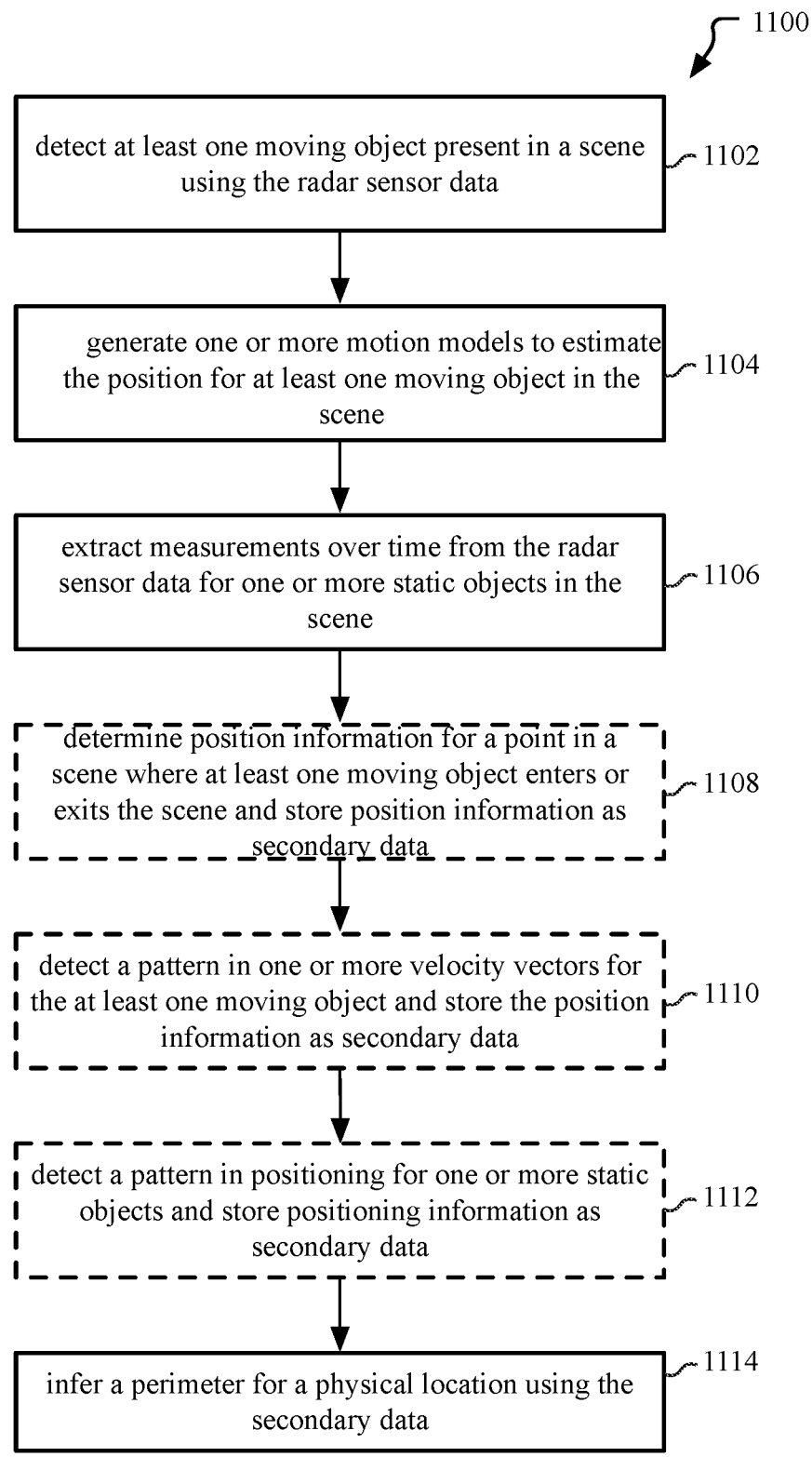
FIG. 11 is a flow chart for an exemplary method for determining a perimeter of a physical space, according to an embodiment.

FIG. 11 is a flow chart for an exemplary method for determining a perimeter of a physical space, according to an embodiment. At least one moving object present in a scene 208 is detected using the radar sensor data (1102). One or more motion models are generated to estimate the position for at least one moving object in the scene 208 (1104). Measurements over time are extracted for one or more static objects in the scene (1106). The motion models and information on static objects may be used with secondary data as described to provide an estimate for the perimeter of a physical space. Secondary data detected using one or more optional techniques (1108-1112) may be used to create inferences about the perimeter for a physical space (1114).

Optionally, when at least one moving object is detected as moving outside the scene or appearing in the scene, then the position information for these one or more points for appearance and reappearance of moving objects may be recorded (1108). The motion model data may be used to track a person as they move throughout the physical space. An inference is made that the position information recorded when the person entered or exited the physical space may represent a doorway, a window, an area with a concave corner, a passageway, and/or any other inference about the perimeter of the physical space. Although examples are provided with a person as a moving object, those with skill in the art will recognize that any object exiting or entering a space could provide an inference for the existence of a doorway, window, etc.

Optionally, long term movement patterns may be observed with the use of motion models for moving objects in the scene. A pattern may be detected in velocity vectors and/or ground tracks for at least one moving object (1110). For example, there is a high correlation between ground tracks being aligned with a wall position. Long term patterns for movement of an object within the physical space may allow for inferences as to the boundary of the physical space. The motion models for moving objects may provide information on velocity vectors for each moving object. Velocity vectors tend to be lower when approaching walls and higher when approaching doorways. As such, positioning information for points where the pattern is detected may be stored as secondary data for determining the perimeter of the physical space. A heat map of user positions and velocity vectors may be recorded. With knowledge of typical room geometries (e.g., building codes, wall lengths, angles, square footage, etc.) a best fit approximation to the elements in the physical space may be constructed.

Optionally, positioning data for static objects with a detected pattern may indicate the presence of a door and allow for an inference for a wall in the perimeter of a physical space (1112). When an electronic device observes a scene without moving objects, estimation for static objects (e.g., static reflectors) positions may stay relatively constant, with little variation. In particular, movement of furniture with a physical space may happen with less frequency over time. A notable exception is doors. A door represents a relatively large, almost floor to ceiling static reflector that is close to a rectangular plane. Over time, the doors are open or closed intermittently in a variety of open and closed positions. This pattern of positions for the door may allow for the inference about a static reflector in the physical space with properties of a door having repeatedly positioned in particular states. Additionally, if a moving object enters and exits through the doorway and the static reflector has properties of a door, then an inference may be made that the static object is a door within a wall.

Figure 12:
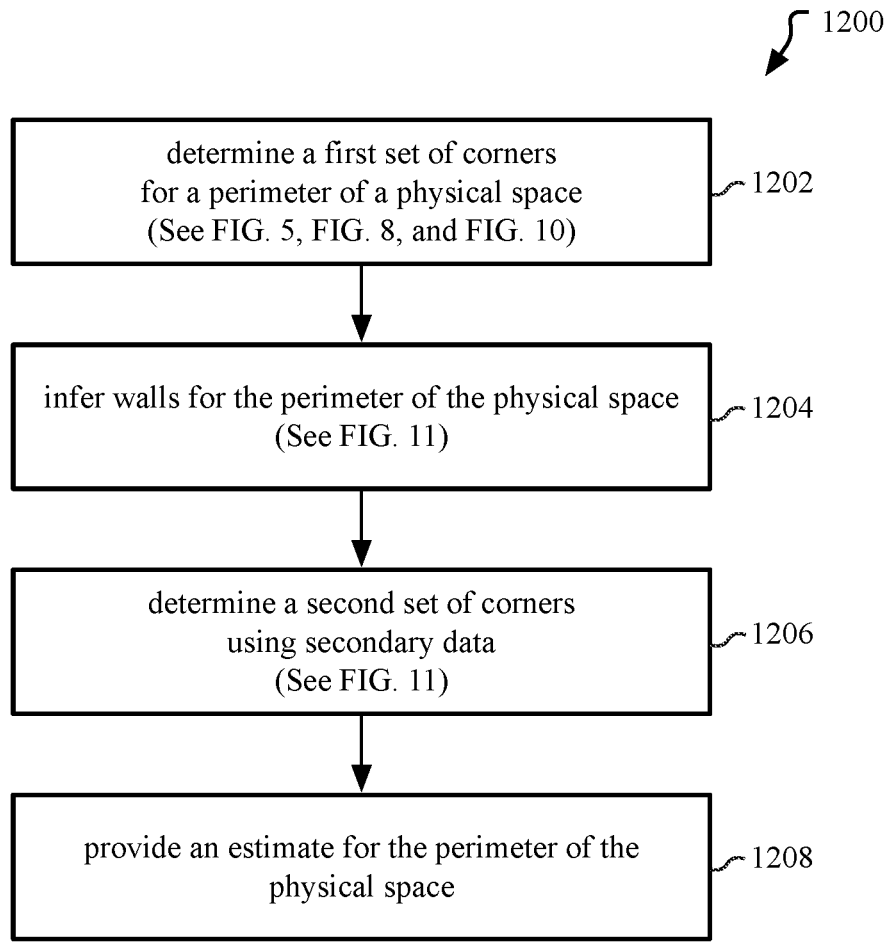
FIG. 12 is a flow chart for an exemplary method for determining a perimeter of a physical space, according to an embodiment.

FIG. 12 is a flowchart 1200 for an exemplary method for determining a perimeter of a physical space, according to an embodiment. A first set of corners for a perimeter of a physical space is determined (1202). Concave corners may be determined using corner detection as described in FIG. 5, shadow detection as described in FIG. 8, and mirror detection as describe in FIG. 10. Secondary data may be used to infer the presence of walls using long-term movement patterns, door detection, or entry/exit detection as described with FIG. 11. Inferences may be made about the presence of walls for the perimeter of the physical space (1204). A second set of convex corners may be inferred with secondary data (1206) as described with FIG. 11. An estimate is provided for the perimeter of the physical space (1208).

Figure 13:
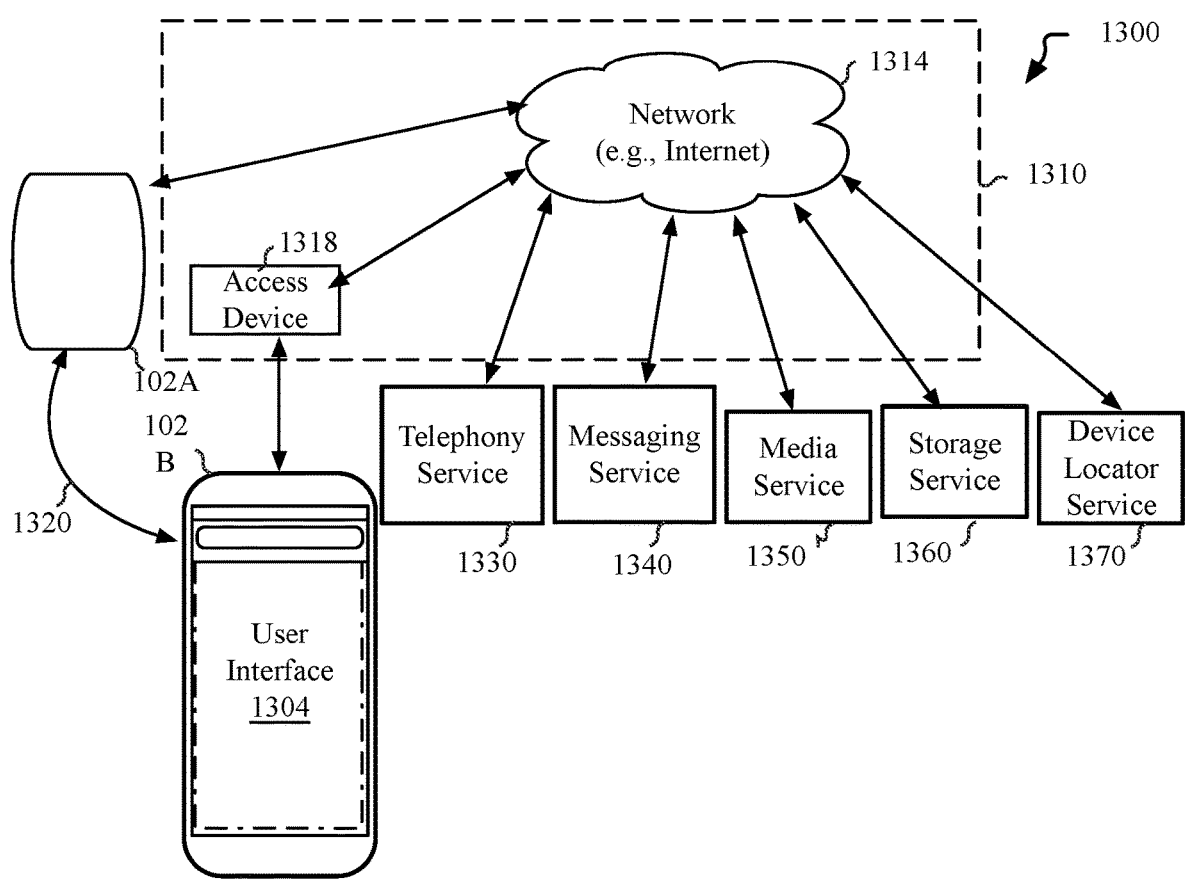
FIG. 13 is a block diagram of a network operating environment for an electronic device, according to an embodiment.

FIG. 13 is a block diagram of a network operating environment 700 for electronic device, according to an embodiment. The network operating environment 100 includes multiple devices, such as a communal or multi-user device with electronic device 102A and optionally electronic device 102B. Electronic devices 102A and/or 102B may implement the perimeter identifying techniques described herein. The electronic devices 102A-102B can each be any electronic device capable of communicating with a wireless network 1314 and a wireless accessory device. Some example electronic devices include but are not limited to a smartphone, a tablet computer, a notebook computer, a wearable computer (e.g., smartwatch or other wearable computing accessory), a mobile media player, a personal digital assistant, EarPods, AirPods, locator tags, headphones, head mounted display, health equipment, a smart speaker, communal or multi-user devices, a mobile device, and other similar devices. Each of electronic device 102A and electronic device 102B optionally can include a user interface, such as user interface 1304 of electronic device 102B. In other embodiments, electronic device 102A may not have a user interface. In some embodiments, electronic device 102A and/or 102B may be a third-party device that utilizes an application programming interface to access device services. The third-party device may be provided by a different device manufacturer or be part of a different ecosystem (e.g., operating system) from electronic device 102A and 102B. Electronic device 102A and electronic device 102B can communicate over one or more wired and/or wireless networks 1310 to perform data communication. For example, a wireless network 1314 (e.g., cellular network, Wi-Fi network) can communicate with a wide area network, such as the Internet. Likewise, an access device 1318, such as an electronic hotspot wireless access device, can provide communication access to the wireless network 1314. The access device 1318 can then communicate with the wireless network 1314 over a combination of wired and/or wireless networks.

In some implementations, both voice and data communications can be established over the wireless network 1314 and/or the access device 1318. For example, electronic device 102B and/or 102B can place and receive phone calls (e.g., using VoIP protocols), send and receive e-mail messages (e.g., using POP3 protocol), and retrieve electronic documents and/or streams, such as web pages, photographs, and videos, over the wireless network 1314, and wide area network (e.g., using TCP/IP or UDP protocols). In some implementations, electronic device 102B can place and receive phone calls, send and receive e-mail messages, and retrieve electronic documents over the access device 1318 and the wireless network 1314. In some implementations, mobile device 102A or mobile device 102B can be physically connected to the access device 1318 using one or more cables, for example, where the access device 1318 is a personal computer. In this configuration, mobile device 102A or mobile device 102B can be referred to as a "tethered" device. In one embodiment, mobile device 102A can communicate with mobile device 102B via a wireless peer-to-peer connection 1320. The wireless peer-to-peer connection 1320 can be used to synchronize data between the devices. In particular embodiments, electronic device 102A may access services associated with a user account and/or services accessible on electronic device 102B using the peer-to-peer connection.

Electronic device 102A and/or electronic device 102B can communicate with one or more services, such as a telephony service 1330, a messaging service 1340, a media service 1350, a storage service 1360, and a device locator service 1370 over the one or more wired and/or wireless networks 1310. For example, the telephony service 1330 can enable telephonic communication between mobile device 102A and mobile device 102B, or between a mobile device and a wired telephonic device. The telephony service 1330 can route voice over IP (VOIP) calls over the wide area network 1314 or can access a cellular voice network (e.g., wireless network). The messaging service 1340 can, for example, provide e-mail and/or other messaging services. The media service 1350 can, for example, provide access to media files, such as song files, audio books, movie files, video clips, and other media data. The storage service 1360 can provide network storage capabilities to mobile device 102A and mobile device 102B to store documents and media files. The device locator service 1370 can enable a user to locate a lost or misplaced device that was, at least at some point, connected to the one or more wired and/or wireless networks 1310. Other services can also be provided, including a software update service to update operating system software or client software on the mobile devices. In one embodiment, the messaging service 1340, media service 1350, storage service 1360, and device locator service 1370 can each be associated with a cloud service provider, where the various services are facilitated via a cloud services account associated with a user account corresponding to the identity determined with the methods described herein.

Electronic device 102A-102B may have applications, services, and functionality locally accessible on the devices. In particular, electronic device 102A may be a communal device that accesses services such as messaging services 1340 and telephony services 1330 via electronic device 102B.

Figure 14:
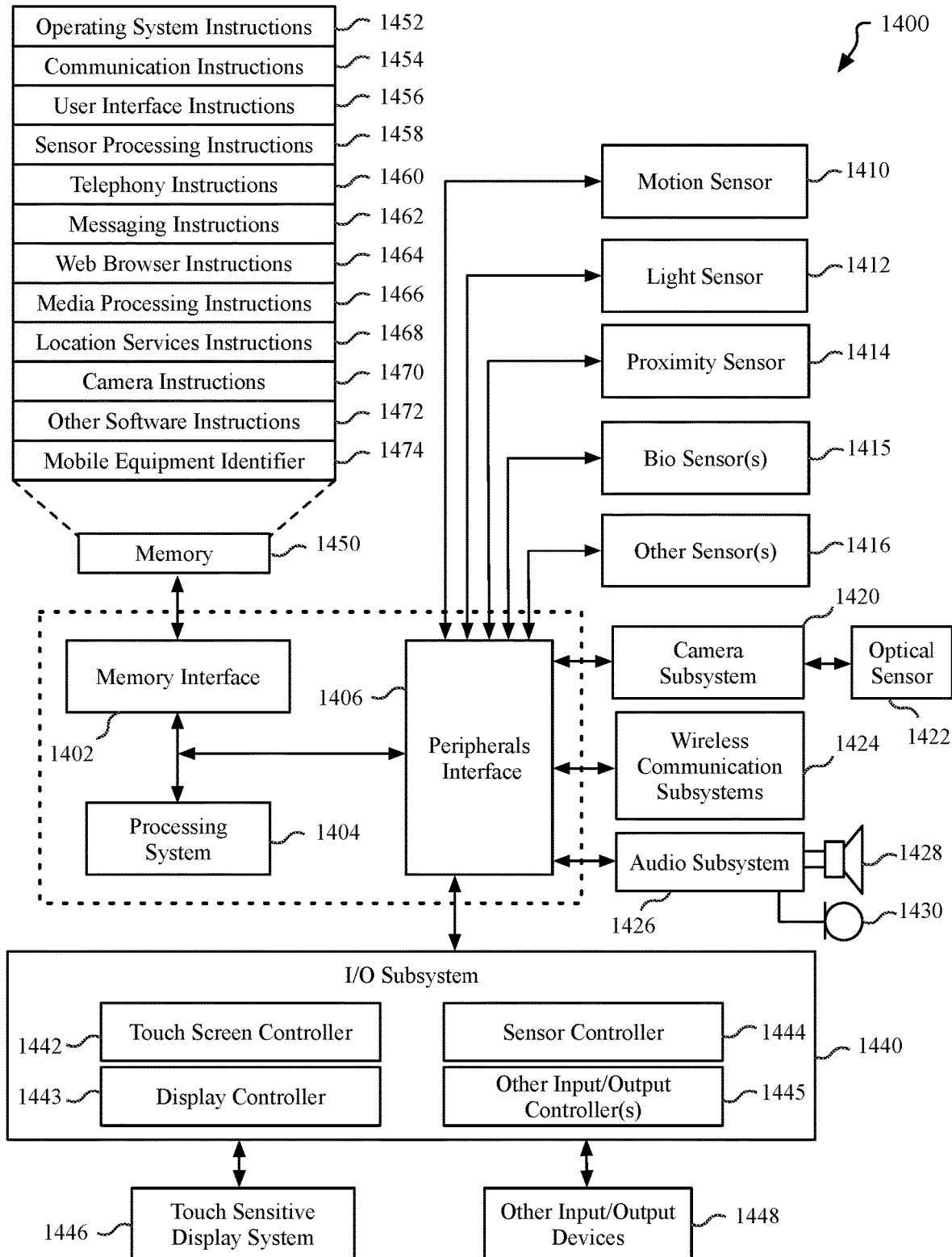
FIG. 14 is a block diagram of a device architecture for a mobile or embedded device, according to an embodiment.

FIG. 14 is a block diagram of a device architecture 1400 for a mobile or embedded device, according to an embodiment. The device architecture 1400 includes a memory interface 1402, a processing system 1404 including one or more data processors, image processors and/or graphics processing units, and a peripherals interface 1406. The various components can be coupled by one or more communication buses or signal lines. The various components can be separate logical components or devices or can be integrated in one or more integrated circuits, such as in a system on a chip integrated circuit.

The memory interface 1402 can be coupled to memory 1450, which can include high-speed random-access memory such as static random-access memory (SRAM) or dynamic random-access memory (DRAM) and/or non-volatile memory, such as but not limited to flash memory (e.g., NAND flash, NOR flash, etc.).

Sensors, devices, and subsystems can be coupled to the peripherals interface 1406 to facilitate multiple functionalities. For example, a motion sensor 1410, a light sensor 1412, and a proximity sensor 1414 can be coupled to the peripherals interface 1406 to facilitate the mobile device functionality. One or more biometric sensor(s) 1415 may also be present, such as a fingerprint scanner for fingerprint recognition or an image sensor for facial recognition. Other sensors 1416 can also be connected to the peripherals interface 1406, such as a positioning system (e.g., GPS receiver), a temperature sensor, or other sensing device, to facilitate related functionalities. A camera subsystem 1420 and an optical sensor 1422, e.g., a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 1424, which can include radio frequency receivers and transmitters and/or optical (e.g., infrared) receivers and transmitters. The specific design and implementation of the wireless communication subsystems 1424 can depend on the communication network(s) over which a mobile device is intended to operate. For example, a mobile device including the illustrated device architecture 1400 can include wireless communication subsystems 1424 designed to operate over a GSM network, a CDMA network, an LTE network, a Wi-Fi network, a Bluetooth network, or any other wireless network. In particular, the wireless communication subsystems 1424 can provide a communications mechanism over which a media playback application can retrieve resources from a remote media server or scheduled events from a remote calendar or event server.

An audio subsystem 1426 can be coupled to a speaker 1428 and a microphone 1430 to facilitate voice-enabled functions, such as voice recognition, voice replication, digital recording, and telephony functions. In smart media devices described herein, the audio subsystem 1426 can be a high-quality audio system including support for virtual surround sound.

The I/O subsystem 1440 can include a touch screen controller 1442 and/or other input controller(s) 1445. For computing devices including a display device, the touch screen controller 1442 can be coupled to a touch sensitive display system 1446 (e.g., touch-screen). The touch sensitive display system 1446 and touch screen controller 1442 can, for example, detect contact and movement and/or pressure using any of a plurality of touch and pressure sensing technologies, including but not limited to capacitive, resistive, infrared, and surface acoustic wave technologies, as well as other proximity sensor arrays or other elements for determining one or more points of contact with a touch sensitive display system 1446. Display output for the touch sensitive display system 1446 can be generated by a display controller 1443. In one embodiment, the display controller 1443 can provide frame data to the touch sensitive display system 1446 at a variable frame rate.

In one embodiment, a sensor controller 1444 is included to monitor, control, and/or processes data received from one or more of the motion sensor 1410, light sensor 1412, proximity sensor 1414, or other sensors 1416. The sensor controller 1444 can include logic to interpret sensor data to determine the occurrence of one or more motion events or activities by analysis of the sensor data from the sensors.

In one embodiment, the I/O subsystem 1440 includes other input controller(s) 1445 that can be coupled to other input/control devices 1448, such as one or more buttons, rocker switches, thumb-wheel, infrared port, USB port, and/or a pointer device such as a stylus, or control devices such as an up/down button for volume control of the speaker 1428 and/or the microphone 1430.

In one embodiment, the memory 1450 coupled to the memory interface 1402 can store instructions for an operating system 1452, including portable operating system interface (POSIX) compliant and non-compliant operating system or an embedded operating system. The operating system 1452 may include instructions for handling basic system services and for performing hardware dependent tasks. In some implementations, the operating system 1452 can be a kernel.

The memory 1450 can also store communication instructions 1454 to facilitate communicating with one or more additional devices, one or more computers and/or one or more servers, for example, to retrieve web resources from remote web servers. The memory 1450 can also include user interface instructions 1456, including graphical user interface instructions to facilitate graphic user interface processing.

Additionally, the memory 1450 can store sensor processing instructions 1458 to facilitate sensor-related processing and functions; telephony instructions 1460 to facilitate telephone-related processes and functions; messaging instructions 1462 to facilitate electronic-messaging related processes and functions; web browser instructions 1464 to facilitate web browsing-related processes and functions; media processing instructions 1466 to facilitate media processing-related processes and functions; location services instructions including GPS and/or navigation instructions 1468 and Wi-Fi based location instructions to facilitate location based functionality; camera instructions 1470 to facilitate camera-related processes and functions; and/or other software instructions 1472 to facilitate other processes and functions, e.g., security processes and functions, and processes and functions related to the systems. The memory 1450 may also store other software instructions such as web video instructions to facilitate web video-related processes and functions; and/or web shopping instructions to facilitate web shopping-related processes and functions. In some implementations, the media processing instructions 1466 are divided into audio processing instructions and video processing instructions to facilitate audio processing-related processes and functions and video processing-related processes and functions, respectively. A mobile equipment identifier, such as an International Mobile Equipment Identity (IMEI) 1474 or a similar hardware identifier can also be stored in memory 1450.

Each of the above identified instructions and applications can correspond to a set of instructions for performing one or more functions described above. These instructions need not be implemented as separate software programs, procedures, or modules. The memory 1450 can include additional instructions or fewer instructions. Furthermore, various functions may be implemented in hardware and/or in software, including in one or more signal processing and/or application specific integrated circuits.

Figure 15:
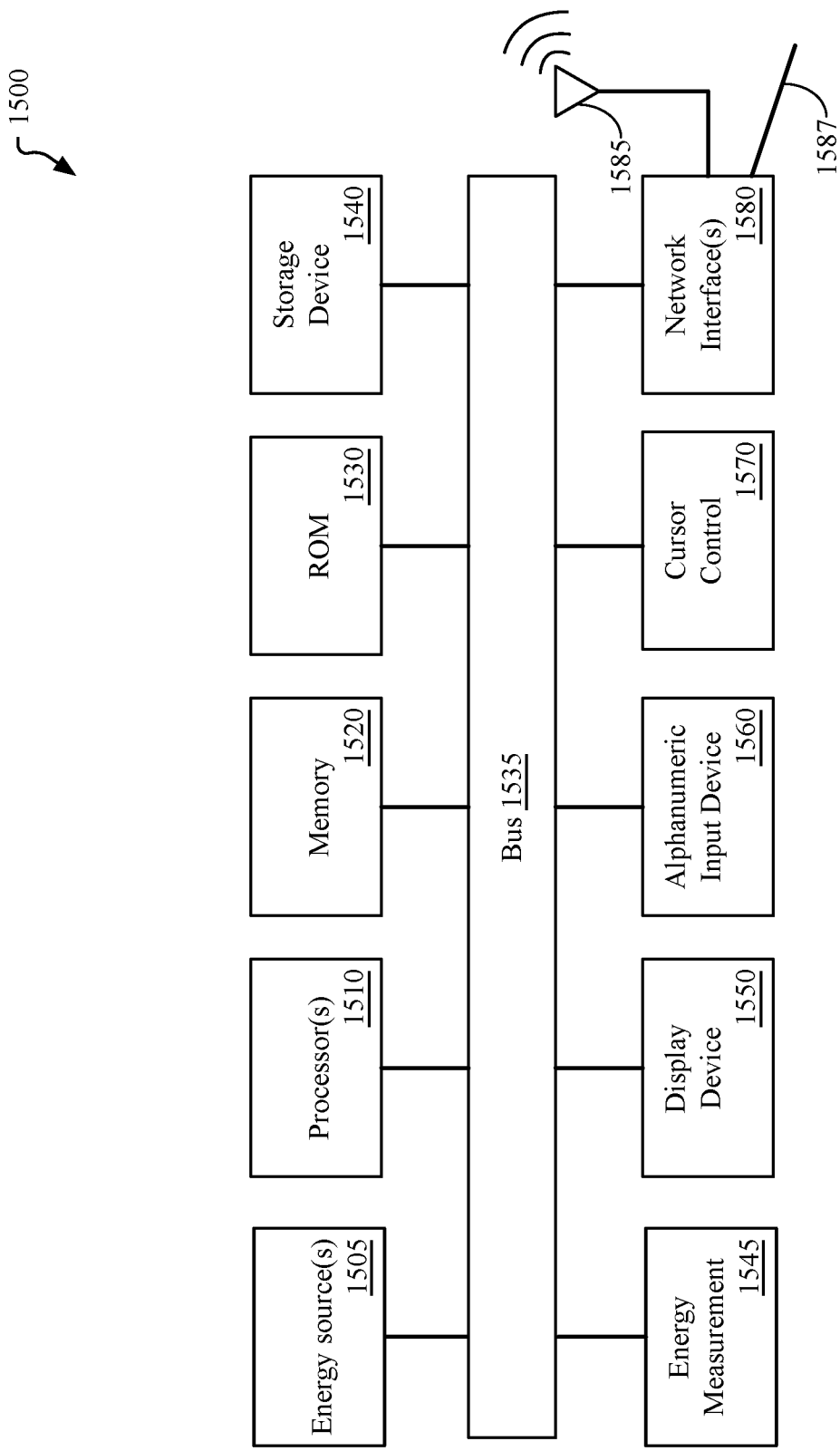
FIG. 15 is a block diagram of a computing system, according to an embodiment.

FIG. 15 is a block diagram of a computing system 1500, according to an embodiment. The illustrated computing system 1500 is intended to represent a range of computing systems (either wired or wireless) including, for example, desktop computer systems, laptop computer systems, tablet computer systems, cellular telephones, personal digital assistants (PDAs) including cellular-enabled PDAs, set top boxes, entertainment systems or other consumer electronic devices, smart appliance devices, or one or more implementations of a smart media playback device. Alternative computing systems may include more, fewer and/or different components. The computing system 1500 can be used to provide the computing device and/or a server device to which the computing device may connect.

The computing system 1500 includes bus 1535 or other communication device to communicate information, and processor(s) 1510 coupled to bus 1535 that may process information. While the computing system 1500 is illustrated with a single processor, the computing system 1500 may include multiple processors and/or co-processors. The computing system 1500 further may include memory 1520 configured as random access memory (RAM) or other dynamic storage device coupled to the bus 1535. The memory 1520 may store information and instructions that may be executed by processor(s) 1510. Memory 1520 may also be used to store temporary variables or other intermediate information during execution of instructions by the processor(s) 1510.

The computing system 1500 may also include read only memory (ROM) 1530 and/or another data storage device 1540 coupled to the bus 1535 that may store information and instructions for the processor(s) 1510. The data storage device 1540 can be or include a variety of storage devices, such as a flash memory device, a magnetic disk, or an optical disc and may be coupled to computing system 1500 via the bus 1535 or via a remote peripheral interface.

The computing system 1500 may also be coupled, via the bus 1535, to a display device 1550 to display information to a user. The computing system 1500 can also include an alphanumeric input device 1560, including alphanumeric and other keys, which may be coupled to bus 1535 to communicate information and command selections to processor(s) 1510. Another type of user input device includes a cursor control 1570 device, such as a touchpad, a mouse, a trackball, or cursor direction keys to communicate direction information and command selections to processor(s) 1510 and to control cursor movement on the display device 1550. The computing system 1500 may also receive user input from a remote device that is communicatively coupled via one or more network interface(s) 1580.

The computing system 1500 further may include one or more network interface(s) 1580 to provide access to a network, such as a local area network. The network interface(s) 1580 may include, for example, a wireless network interface having antenna 1585, which may represent one or more antenna (e). The computing system 1500 can include multiple wireless network interfaces such as a combination of Wi-Fi, Bluetooth®, near field communication (NFC), and/or cellular telephony interfaces. The network interface(s) 1580 may also include, for example, a wired network interface to communicate with remote devices via network cable 1587, which may be, for example, an Ethernet cable, a coaxial cable, a fiber optic cable, a serial cable, or a parallel cable.

In one embodiment, the network interface(s) 1580 may provide access to a local area network, for example, by conforming to IEEE 802.13 standards, and/or the wireless network interface may provide access to a personal area network, for example, by conforming to Bluetooth standards. Other wireless network interfaces and/or protocols can also be supported. In addition to, or instead of, communication via wireless LAN standards, network interface(s) 1580 may provide wireless communications using, for example, Time Division, Multiple Access (TDMA) protocols, Global System for Mobile Communications (GSM) protocols, Code Division, Multiple Access (CDMA) protocols, Long Term Evolution (LTE) protocols, and/or any other type of wireless communications protocol.

The computing system 1500 can further include one or more energy sources 1505 and one or more energy measurement systems 1545. Energy sources 1505 can include an AC/DC adapter coupled to an external power source, one or more batteries, one or more charge storage devices, a USB charger, or other energy source. Energy measurement systems include at least one voltage or amperage measuring device that can measure energy consumed by the computing system 1500 during a predetermined period of time. Additionally, one or more energy measurement systems can be included that measure, e.g., energy consumed by a display device, cooling subsystem, Wi-Fi subsystem, or other frequently used or high-energy consumption subsystem.

As described above, some aspects of the subject matter of this specification include gathering and use of data available from various sources to improve services a mobile device can provide to a user. The present disclosure contemplates that in some instances, this gathered data may identify a particular location or an address based on device usage. Such personal information data can include location-based data, addresses, subscriber account identifiers, or other identifying information.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

In the case of advertisement delivery services, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publicly available information.

Although the embodiments have been described in language specific to structural features and/or methodological acts, it is to be understood that the appended claims are not necessarily limited to the specific features or acts described. The specific features and acts disclosed are instead to be understood as embodiments of the claims useful for illustration.

It should be noted that the term "approximately" or "substantially" may be used herein and may be interpreted as "as nearly as practicable," "within technical limitations," and the like. In addition, the use of the term "or" indicates an inclusive or (e.g. and/or) unless otherwise specified.

As described above, one aspect of the present technology is the gathering and use of data available from various specific and legitimate sources to enable identifying users to provide a personalized experience when interacting with a device, such as using a virtual assistant. The present disclosure contemplates that in some instances, this gathered data may include personal information data that uniquely identifies or can be used to identify a specific person. Such personal information data can include demographic data, location-based data, online identifiers, telephone numbers, email addresses, social media IDs, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to learn new words, improve keyboard layouts, improve auto-correct engines for keyboards, and to enable an electronic device to better anticipate the needs of a user. Further, other uses for personal information data that benefit the user are also contemplated by the present disclosure. For instance, health and fitness data may be used, in accordance with the user's preferences, to provide insights into their general wellness, or may be used as positive feedback to individuals using technology to pursue wellness goals.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominently and easily accessible by users and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations which may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, users can opt out of identification by a device provide a personalized experience, and/or a user may opt out of setting up a profile with a device for the virtual assistant.

In the foregoing description, example embodiments of identification of a user based on a stored profile have been described. It will be evident that various modifications can be made thereto without departing from the broader spirit and scope of the disclosure. The specification and drawings are, accordingly, to be regarded in an illustrative sense rather than a restrictive sense. The specifics in the descriptions and examples provided may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to perform acts of the method, or of an apparatus or system according to embodiments and examples described herein. Additionally, various components described herein can be a means for performing the operations or functions described herein.

Although the embodiments have been described in language specific to structural features and/or methodological acts, it is to be understood that the appended claims are not necessarily limited to the specific features or acts described. The specific features and acts disclosed are instead to be understood as embodiments of the claims useful for illustration.

What is claimed is:

1. A system to determine a perimeter of a physical space on an electronic device, the system comprising:
   at least one radar sensor, wherein the at least one radar sensor comprises an array of receivers arranged in a plane that sense depth via radar signal modulation;
   one or more processors configured to:
      receive radar sensor data with the at least one radar sensor;
      perform a comparison between received energy level values for one or more points in a scene from the received radar sensor data;
      detect one or more reflector points based on the comparison, wherein the one or more reflector points have first energy level values that are higher than second energy level values attributed to other points in the received radar sensor data; and
      determine an estimation for the perimeter of the physical space based on the one or more reflector points, wherein the one or more reflector points correspond to corners of the physical space.

2. The system of claim 1, wherein the one or more reflector points are vertexes in the estimation for the perimeter of the physical space.

3. The system of claim 1, wherein the one or more reflector points have the first energy level values that meet or exceed a threshold value above the second energy level values attributed to the other points.

4. The system of claim 1, wherein the one or more reflector points are determined to be convex corners.

5. A system to determine a perimeter of a physical space on an electronic device, the system comprising:
   at least one radar sensor, wherein the at least one radar sensor comprises an array of receivers arranged in a plane that sense depth via radar signal modulation;
   one or more processors configured to:
      receive radar sensor data from the at least one radar sensor;
      determine a first set of convex corners for the perimeter of the physical space;
      detect a pattern in one or more velocity vectors for at least one moving object;
      determine position information associated with the pattern;
      infer at least one of a wall or a corner for the perimeter of the physical space using the position information; and
      provide an estimate for the perimeter of the physical space.

6. The system of claim 5, wherein the one or more processors are further configured to:
   Record, in the heat map, the position information associated with the pattern and the one or more velocity vectors.

7. The system of claim 5, wherein the one or more processors are further configured to:
   detect the at least one moving object from the received radar sensor data.

8. The system of claim 5, wherein the one or more processors are further configured to:
   generate one or more motion models to estimate positions for the at least one moving object, wherein the one or more motion models are configured to provide information on the one ore more velocity vectors for the at least one moving object.

9. A system to determine a perimeter of a physical space on an electronic device, the system comprising:
   at least one radar sensor, wherein the at least one radar sensor comprises an array of receivers arranged in a plane that sense depth via radar signal modulation;
   one or more processors configured to:
      receive radar sensor data from the at least one radar sensor;
      determine a first set of convex corners for the perimeter of the physical space;
      detect a pattern in a set of positions for one or more static objects;
      determine position information associated with the pattern;
      infer at least one of a wall or a corner for the perimeter of the physical space using the position information; and
      provide an estimate for the perimeter of the physical space.

10. The system of claim 9, wherein the one or more processors are further configured to:
    detect the one or more static objects from the received radar sensor data.

11. The system of claim 9, wherein the one or more processors are further configured to:
    generate one or more motion models to estimate the set of positions for one or more static objects.

12. The system of claim 9, wherein the pattern in the set of positions is used to infer that the one or more static objects is a door.

13. A system to determine a perimeter of a physical space on an electronic device, the system comprising:
    at least one radar sensor, wherein the at least one radar sensor comprises an array of receivers arranged in a plane that sense depth via radar signal modulation;
    one or more processors to:
       receive radar sensor data from the at least one radar sensor;
       detect at least two moving objects present in a scene using the received radar sensor data;
       extract measurements over time from the received radar sensor data for each of the at least two moving objects;
       perform a comparison between the measurements from the at least two moving objects;
       based on the comparison, detect one or more plane symmetric properties between the measurements that meet a threshold for identifying a reflective object; and
       determine a physical location for the reflective object in the physical space using the measurements.

14. The system of claim 13, wherein the at least two moving objects comprise a first moving object and a reflection of the first moving object that is perceived as a second moving object prior to the comparison.

15. The system of claim 13, wherein the one or more processors are further configured to:
    extract features from the received radar sensor data for each of the at least two moving objects present in the scene and classify, based on a set of the features, each of the at least two moving objects as a human.

16. The system of claim 13, wherein the measurements comprise at least one of a velocity, movement, a first plurality of points for an x dimension, or a second plurality of points for a y dimension.

17. The system of claim 13, wherein the one or more processors are further configured to:
   determine an estimation for the perimeter of the physical space based on the physical location for the reflective object.

\* \* \* \* \*